(12) United States Patent
Shah et al.

(10) Patent No.: US 12,169,404 B2
(45) Date of Patent: Dec. 17, 2024

(54) ENHANCED UNMANNED AERIAL VEHICLE FLIGHT ALONG COMPUTED SPLINES

(71) Applicant: Skydio, Inc., Redwood City, CA (US)

(72) Inventors: Saumya Pravinbhai Shah, Sunnyvale, CA (US); Matthew Thomas Beaudouin-Lafon, La Jolla, CA (US); Kristen Marie Holtz, Menlo Park, CA (US); James Anthony Ferrandini, San Rafael, CA (US); Hayk Martirosyan, San Francisco, CA (US); Matthew Joseph Donahoe, Redwood City, CA (US); Charles Vanschoonhoven Wood, Cazenovia, NY (US); Clara Kelley, Half Moon Bay, CA (US); Adam Parker Bry, Redwood City, CA (US); Jack Louis Zhu, San Mateo, CA (US)

(73) Assignee: Skydio, Inc., San Mateo, CA (US)

( * ) Notice: Subject to any disclaimer, the term of this patent is extended or adjusted under 35 U.S.C. 154(b) by 134 days.

(21) Appl. No.: 17/689,414

(22) Filed: Mar. 8, 2022

(65) Prior Publication Data

US 2023/0161338 A1    May 25, 2023

Related U.S. Application Data

(60) Provisional application No. 63/296,285, filed on Jan. 4, 2022, provisional application No. 63/282,725, filed on Nov. 24, 2021.

(51) Int. Cl.
*G05D 1/00*    (2024.01)
*B64C 39/02*    (2023.01)
(Continued)

(52) U.S. Cl.
CPC ......... *G05D 1/0016* (2013.01); *B64C 39/024* (2013.01); *B64D 43/02* (2013.01);
(Continued)

(58) Field of Classification Search
CPC .... G05D 1/0016; G05D 1/0094; G05D 1/101; B64C 39/024; B64D 43/02; B64D 47/08;
(Continued)

(56) References Cited

U.S. PATENT DOCUMENTS

| 9,678,507 B1 * | 6/2017 | Douglas | ............... G08G 5/0013 |
| 2017/0039859 A1 * | 2/2017 | Hu | ............................ G09B 9/08 |

(Continued)

FOREIGN PATENT DOCUMENTS

| EP | 3699552 A1 | 8/2020 |
| WO | 2017/143588 A1 | 8/2017 |

OTHER PUBLICATIONS

International Application No. PCT/US2022/080412, International Search Report, Written Opinion, 10 pages, Mar. 31, 2023.

*Primary Examiner* — Anne Marie Antonucci
*Assistant Examiner* — Wesam Almadhrhi

(57) ABSTRACT

Technology for operating an unmanned aerial vehicle (UAV) is disclosed herein that allows a drone to be flown along a computed spline, while also accommodating in-flight modifications. In various implementations, a UAV includes a flight control subsystem and an electromechanical subsystem. The flight control subsystem records keyframes during flight and computes a spline based on the keyframes. The flight control subsystem then saves the computed spline for playback, at which time the UAV automatically flies in accordance with the computed spline.

30 Claims, 35 Drawing Sheets

(51) Int. Cl.
  *B64D 43/02*     (2006.01)
  *B64D 47/08*     (2006.01)
  *G05D 1/10*      (2006.01)
  *G05D 1/223*     (2024.01)
  *G05D 1/654*     (2024.01)
  *G05D 1/689*     (2024.01)
  *G08G 5/00*      (2006.01)
  *H04N 23/60*     (2023.01)
  *B64U 10/13*     (2023.01)
  *B64U 101/00*    (2023.01)
  *B64U 101/30*    (2023.01)
  *H04N 23/67*     (2023.01)
  *H04N 23/695*    (2023.01)

(52) U.S. Cl.
  CPC ........... B64D 47/08 (2013.01); G05D 1/0094 (2013.01); G05D 1/101 (2013.01); G05D 1/223 (2024.01); G05D 1/654 (2024.01); G05D 1/689 (2024.01); G08G 5/003 (2013.01); H04N 23/64 (2023.01); *B64U 10/13* (2023.01); *B64U 2101/00* (2023.01); *B64U 2101/30* (2023.01); *B64U 2201/20* (2023.01); *H04N 23/67* (2023.01); *H04N 23/695* (2023.01)

(58) Field of Classification Search
  CPC ...... B64D 43/00; G08G 5/003; G08G 5/0013; G08G 5/0021; G08G 5/0039; G08G 5/0052; G08G 5/0069; G08G 5/045; H04N 23/64; H04N 23/67; H04N 23/695; H04N 23/69; B64U 10/13; B64U 2101/00; B64U 2101/30; B64U 2201/20
  See application file for complete search history.

(56) References Cited

U.S. PATENT DOCUMENTS

2018/0362158 A1\* 12/2018 Zhang .................. G08G 5/0069
2019/0094863 A1\*  3/2019 Silva ................... G08G 5/0086
2019/0250601 A1\*  8/2019 Donahoe ............... G06F 3/0482
2019/0268720 A1   8/2019 Cantrell et al.
2020/0372813 A1\* 11/2020 Smith .................. G08G 5/0039
2022/0301192 A1   9/2022 Boardman et al.
2023/0071981 A1\*  3/2023 Shapira ................. G05D 1/101

\* cited by examiner

ENHANCED UNMANNED AERIAL VEHICLE FLIGHT ALONG COMPUTED SPLINES

CROSS-REFERENCE TO RELATED APPLICATIONS

The present application claims priority to U.S. Provisional Patent Application No. 63/282,725 entitled "ENHANCED UNMANNED AERIAL VEHICLE FLIGHT ALONG COMPUTED SPLINES" filed on Nov. 24, 2021 and to U.S. Provisional Patent Application No. 63/296,285 entitled "INTERFACES AND CONTROL FOR ENHANCED UNMANNED AERIAL VEHICLE FLIGHT" filed on Jan. 4, 2022. These prior applications are hereby incorporated herein by reference in their entireties.

TECHNICAL FIELD

Various implementations of the present technology relate to unmanned aerial vehicles (UAVs) and, in particular, to enhanced UAV flight along computed splines.

BACKGROUND

Unmanned aerial vehicles (or drones) are commonly used to capture video, images, or other data from a vantage point or location that might otherwise be difficult or cumbersome to reach. Drones are used for various purposes, such as for recreation, scientific exploration, military operations, intelligence gathering, and commercial uses. UAVs for commercial and recreational use typically have multiple rotors so that they are agile and rapidly responsive to flight commands. For example, a popular configuration known as a "quadcopter" comprises four rotors for flight.

The ability of drones to fly programmatically, that is, according to a programmed set of flight instructions, make them useful for repetitive operations such as monitoring a secured perimeter. In addition, once a suitable flight program is determined, no particular skill level of the pilot is necessary. However, while a drone is operating under a programmed set of instructions, this denies the pilot any ability to make minor adjustments to the flight path or to sensor operation on the fly. For example, if the drone video captures something unexpected or if the pilot spontaneously desires to modify the video recording, the pilot must terminate the automated flight operation and resort to manual operation of the drone. Alternatively, the pilot could reprogram the flight plan but risks losing the opportunity to capture potentially important data in the time it takes to reprogram and rerun the flight.

Beyond their more prosaic uses, an occupation for which drones are particularly well-suited and have been enthusiastically adopted is dynamic aerial cinematography. The ability to produce highly dynamic, smooth, single-shot videos was previously only possible in big-budget Hollywood productions using high-end equipment and large teams of trained professionals. In recent years, teams of world-class drone pilots with thousands of hours of "stick time" under their belts were able to create similarly dynamic shots. However, these teams of drone pilots are extremely expensive to employ, and the shots can be time-consuming to capture.

OVERVIEW

Technology for operating an unmanned aerial vehicle (UAV) is disclosed herein that allows a drone to be flown along a computed spline, while also accommodating in-flight modifications. In various implementations, a UAV includes a flight control subsystem and an electromechanical subsystem. The flight control subsystem records keyframes during flight and computes a spline based on the keyframes. The flight control subsystem then saves the computed spline for playback, when the UAV automatically flies in accordance with the computed spline.

In various implementations, the flight control subsystem is capable of receiving user input and responsively modifying the computed spline based at least on the user input, resulting in a modified version of the computed spline. The flight control subsystem may save the modified version of the computed spline for later playback. In some scenarios, the UAV may be capable of uploading (or downloading) the modified version of the compute spline to a remote storage location.

Examples of the user input include one or more of changes to one or more components of the computed spline, such as position, direction, speed, and orientation of the unmanned aerial vehicle along the computed spline. The components may also include a camera focal length and a camera orientation with respect to the unmanned aerial vehicle.

Other examples of the user input include snapping the unmanned aerial vehicle directly to a new position on the computed spline out-of-turn with respect to a next position on the computed spline, reversing direction along the computed spline relative to present direction along the computed spline, and hovering at a point on the computed spline.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

Figure 1:
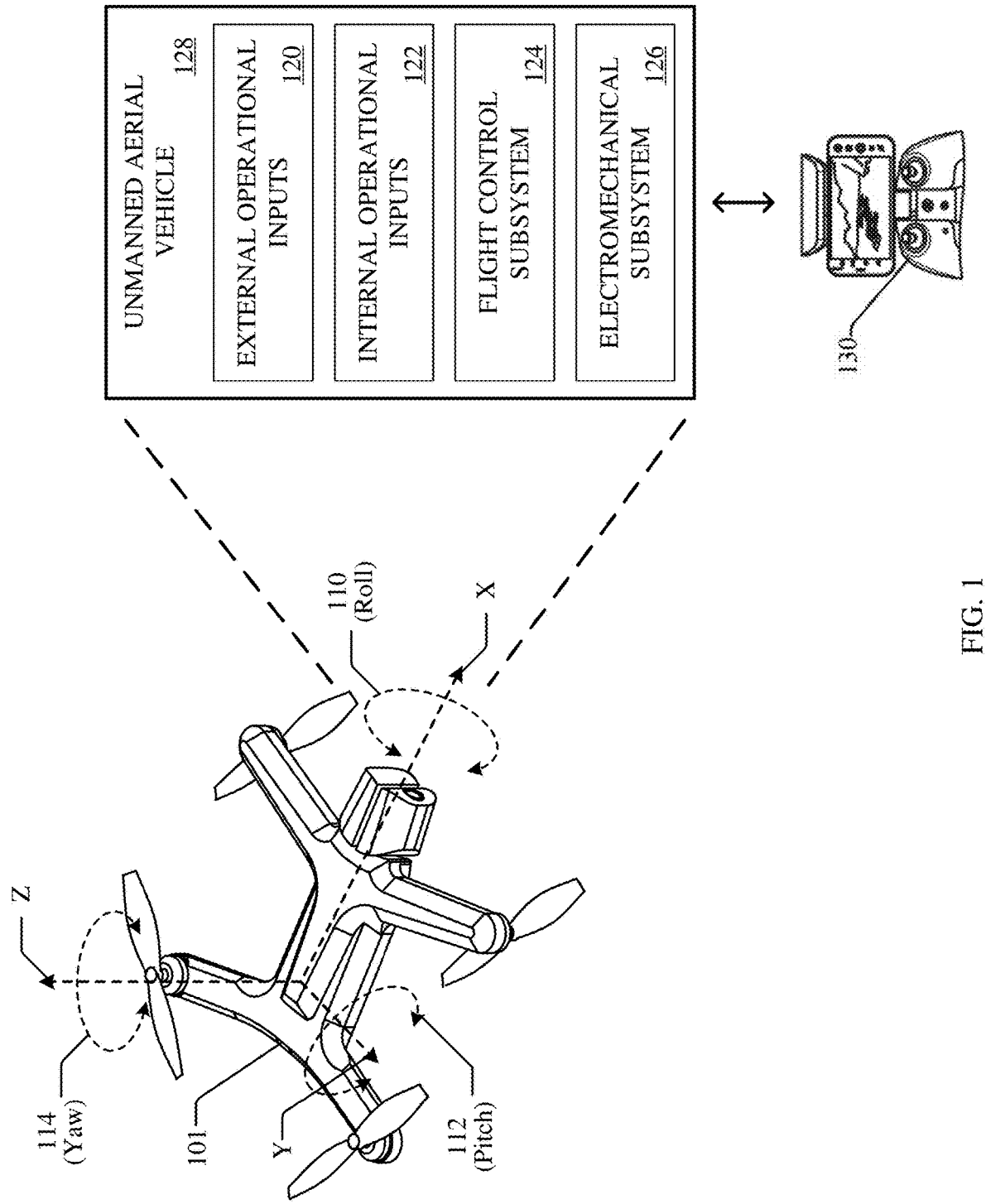
FIG. 1 illustrates an operating architecture of an unmanned aerial vehicle in an implementation.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Technology discussed herein makes it possible for anyone to capture continuous, choreographed shots with complex, cinematic, and smooth camera motion. The user defines a flight path by setting points called "keyframes," and the software creates a smooth spline between the points that can be flown repeatedly, with varying degrees of control, speed, and complexity. Indeed, the technology discussed herein enables any pilot—no matter his or her skill level—to capture complex Hollywood-style camera moves that would be impossible any other way. The technology does not replace human creativity or composition but allows a pilot to unlock incredible shots with just a few taps.

Various implementations disclosed herein include unmanned aerial vehicles that include a flight control subsystem and an electromechanical subsystem. As discussed above, the flight control subsystem is capable of recording keyframes during flight and computing a spline based on the keyframes. The flight control subsystem saves the computed spline for playback, at which time the flight control subsystem directs the electromechanical subsystem to fly the UAV in accordance with the computed spline.

In one or more of the various implementations, the flight control subsystem is also capable of receiving user input and modifying the computed spline based on the user input. The modified version of the computed spline may itself be saved for later playback. The user input may cause one or more changes to the computed spline, such as a change in position, direction, speed, and/or orientation of the unmanned aerial vehicle along the computed spline. Other changes include modifications to a focal length of a camera on the UAV, and orientation of the camera, or changes to any other peripherical instrument on the UAV. Still other examples of the user input include snapping the unmanned aerial vehicle directly to a new position on the computed spline out-of-turn with respect to a next position on the computed spline, reversing direction along the computed spline relative to present direction along the computed spline, and hovering at a point on the computed spline.

In an operational example, a drone pilot operating a controller device identifies a set of discrete spatial locations called keyframes. Resources onboard the drone and/or the controller (or distinct from either system) compute a spline based on the keyframes. The computed spline may then be "played back" by the drone, meaning that the flight control subsystem onboard the drone commands its flight based on the computed spline.

Continuing with the operational example, the pilot can modify the computed spline in-flight, while the drone is flying the spline, allowing the pilot to focus on and control one or more aspects of drone operation without having to actively pilot the drone. The pilot may, for example, alter the position, direction, speed, and/or orientation of the drone as it flies the computed spline. These changes may cause the drone to depart from the computed spline, or change direction as it travels along the spline. The pilot may cause the drone to speed up or slow down along segments of the spline or at points along the spline. The pilot may also modify the operation of a camera, such as zooming in or out or making adjustments to the exposure as the drone flies the spline. In other example, the pilot may cause the drone to reverse course along the computed spline or to "snap-to" a new position on the spline without traveling along the spline. The pilot may also cause the drone to stop and hover at point on the computed spline, for example, to add a keyframe at that location. Any or all of these modifications may be saved for subsequent use with the spline or as a new version of the spline. In some implementations, the pilot may control the orientation of the drone along the spine and/or the gimbal position as the drone travels along the computed spine, i.e., "Free Look Mode." In this manner, the pilot can focus on camera angles and positions without having to actively pilot the drone.

Various technical effects of the disclosed technology may be appreciated from the present disclosure. For example, where the drone is used to record video, a common use of drones, pilot input integrated into programmed operation allows greater creative buy-in to the video product by allowing the pilot to focus on artistic aspects and nuances of the recording without having to actively navigate the drone's flight. The ability to integrate pilot or user input into the operation of a drone as it is flying under the authority of its autopilot can be exercised in a number of ways.

In one example, a UAV flies a programmed or predetermined flight plan. The programmed or predetermined flight plan may be a computed spline flight path where a trajectory is defined by a set of discrete locations through which the drone will pass, or it may be a flight path that was recorded during an earlier flight. It may also be a flight path that was programmed manually and uploaded to the drone. The programmed flight operation of the drone includes such parameters as the position, the orientation and/or velocity of the drone as it flies along the predetermined flight path.

Drone operation may include subject tracking during programmed operation. For example, a drone may be deployed to record a cycling race by flying a programmed route along the racecourse from an overhead perspective while tracking the progress of a particular cyclist. Drone operation may also include object detection and avoidance so that the drone does not collide with a tree while flying over and recording the cycling race. In this way, the pilot can focus on a particular aspect of drone operation, such as the view captured by an onboard video camera without having to actively fly the drone at the same time. When the pilot ceases to control that aspect of drone operation, the drone will smoothly return to and resume its programmed operation.

In another example, the drone or UAV is docked prior to flight. The dock provides the drone with localization information by which the drone can ascertain its position and orientation relative to the dock for navigating during flight. Positional information for navigation may be specified in three-dimensional coordinates, such as a set of coordinates relative to the dock or coordinates detected by an onboard GPS sensor. Positional information for navigation may also incorporate or rely on visual tracking using one or more onboard navigation cameras. Drone orientation information may reference the drone's pitch, roll, and yaw angles. The pilot communicates wirelessly with the drone's flight control system using a remote control. The remote control may be a dedicated device or an app on a computing device such as laptop computer, tablet, or smartphone. The user interface or UI on a UAV remote control may include a display screen and one or more input mechanisms for controlling the drone, such as buttons, rocker switches, sliders, toggles, and the like. One implementation of the user interface on drone remote control includes a touch-enabled display screen, i.e., a touchscreen, which displays functional graphical object representations of control input mechanisms. Wireless transmissions between the UAV and the remote control may be carried over a WiFi connection, a Bluetooth® connection, or any suitable wireless connection. The UAV may also communicate wirelessly with other devices such as a computer which can receive, view, record, and store information transmitted from the drone.

When a UAV pilot issues a command for a drone to launch from the dock and the drone begins its flight, the pilot may actively fly the drone, or the drone may fly according to a predetermined flight plan. In an implementation, a predetermined flight includes a set of keyframes, each of which may be defined according to the visual input of one or more navigation cameras in a process of dead reckoning or visual tracking. Keyframes defined according to visual tracking are particularly useful in indoor or outdoor environments where global positioning system (GPS) data or other inertial navigation data is partially or totally unavailable or with drones which lack inertial or satellite navigation capability. Keyframes locations may also be defined in three-dimensional coordinates relative to the drone dock location or from satellite or inertial navigation data.

A keyframe may contain additional information about the drone orientation, drone speed, or onboard sensor activity. For example, a drone may be programmed to pause at a keyframe and pivot horizontally to capture a panorama shot as the camera zoom lens moves from a telephoto to a wide-angle focal length. The drone's path from one keyframe location to the next is a computed function such as a cubic spline interpolant or "spline."

In another implementation, a predetermined flight plan may be a previously recorded drone flight that was saved to the drone's persistent storage (e.g., nonvolatile memory), or to a data storage device in wireless communication with the drone. The prerecorded flight plan may be uploaded to other drones for reuse. For example, a flight plan for monitoring the perimeter of a secured facility can be recorded and saved for periodic reuse or when the drone is replaced by a back-up drone. A prerecorded flight path may comprise an entire flight from launch from the dock to return to the dock, or it may comprise a subset of the drone's flight, such as the spline between two keyframes, or it may even comprise drone operation (such as a sweeping video shot) at a single location. In yet another implementation, the predetermined flight path may be a computer program that is uploaded to the drone. For example, a flight plan may be programmed based on map or topographical data.

In other implementations, the pilot can record aspects of drone operation such as recording the trajectory of a drone, recording the camera view of the drone, pausing the recording, deleting the recording, and saving the recording. The recorded operations or recorded components of the flight may be saved to onboard nonvolatile memory, or they may be transmitted to a device in communication with the drone, such as to the remote control, to a laptop computer receiving transmissions from the drone, or to cloud data storage.

In still other implementations of the technology, the display screen or touchscreen of the user interface displays a view transmitted from a forward-facing camera on the drone, known as the first-person view, in real time. An augmented reality (AR) graphic representing a predetermined flight path is superimposed on the forward-facing camera view in the form of a translucent curve overlaying the camera view and, optionally, in a color that is highly distinctive from the background. The AR representation may indicate distance from the drone along the flight path by the varying the width of the curve, for example, the curve narrows with distance from the drone. The AR representation continually updates as the drone flies the predetermined flight path. An additional AR graphic may show keyframes or waypoints identified by a distinctive shape and color such as a diamond on the curve representation of the predetermined flight path.

In various implementations, the pilot may add, edit, and delete keyframes on the predetermined flight path via the user interface on the remote control. For example, when a pilot wants to identify and select keyframes for desirable camera views, the user interface displays an AR graphic in the form of a translucent frame over the camera view which frames the camera shot. In addition to the virtual framing, a UI touchscreen may display virtual buttons for adding, editing, and deleting keyframes. Keyframes may record and store such information as drone position or location, drone orientation, and information concerning the operation of onboard sensors such as cameras. The AR representation of a predetermined flight plan defined by keyframes may be updated according to the most recent set of keyframes.

In an implementation, the user interface on the remote control displays a linear playback track or timeline representation of a predetermined flight plan. The linear timeline representation may include keyframes identified by a distinctive shape, such as a diamond, on the timeline. Distances along the timeline may be proportional to actual flight distances. As the drone flies a predetermined flight path, the timeline may indicate the drone's progress along the flight path using one color to show the completed portion and a second color to show the portion remaining; optionally, an arrow or other symbol may travel along the timeline as the drone flies to show in real time the drone's travel along the flight path.

In an implementation, the pilot may issue commands to the drone using the flight path timeline. In an implementation of the timeline graphic on a touchscreen, the pilot may command the drone to reverse direction on the flight path or to pause at a point on the flight path by touching a particular point or location on the displayed timeline. The pilot may also command the drone to snap to (that is, immediately fly to) a point on the spline either by traveling along the spline or by flying directly to the indicated point. For example, the pilot may command the drone to jump to a point between two keyframes and add a keyframe at that location.

In an implementation of the technology, the UI screen also shows drone speed at points along the timeline. The UI may include virtual or physical control mechanisms such as rocker switches or sliders to adjust the drone speed along a segment of the flight path or at a point on the flight path. For example, the pilot may command the drone to pause (i.e., hover) at various keyframes to take a prolonged still view or sweeping view from those vantage points.

In another implementation of the technology, a virtual slider controlling drone speed is displayed in multiple colors to show multiple zones of dynamic feasibility. Starting at the slower end of the slider range, green may indicate the range of speeds which are dynamically feasible for the drone to fly; yellow may indicate the range of speeds pushing the operating envelope of the drone; and red may indicate the range of speeds which are not dynamically feasible for the drone to fly. For example, where a predetermined flight path indicates a turn, the red portion of the slider would correspond to the speeds at which the drone would be unable to navigate the turn without flying off the flight path.

A pilot may retain aspects of operational control of a drone as the drone flies a predetermined flight plan. For example, once a perfected drone flight path is recorded, the pilot may command the drone to re-fly the recorded flight path while manually controlling the camera orientation. Camera orientation can be controlled by changing the drone's pitch, roll, and/or yaw angles. Additionally, as the drone flies a predetermined flight plan, the pilot may issue flight or operational commands via the remote control which cause the drone to deviate slightly from the flight path or to change the drone's orientation as it flies. For example, the pilot may nudge the drone's orientation to turn westward for a several seconds as the drone flies a predetermined path heading north.

In another implementation of the technology, the drone receives and integrates real-time inputs into its flight operations corresponding to the predetermined flight path. When the pilot's real-time inputs cease, the drone effects an automatic return to the predetermined flight path. In yet another implementation of the technology, the real-time inputs are smoothed or dampened resulting in an attenuated adjustment to the drone's flight. When the real-time inputs cease, the return to the predetermined operation is similarly smoothed or dampened.

For example, as a drone is flying a spline, the pilot may activate a subject tracking capability by which the drone will maintains its orientation toward a subject so that the subject is always in view of the drone camera. Alternatively, an object avoidance function may cause the drone to deviate from its programmed flight path if the flight path intersects with an obstacle. In cinematography, the ability to manually control one or more aspects of drone operation (e.g. drone flight dynamics, drone orientation during flight, and onboard camera operation) as the drone navigates a predetermined flight path may give the pilot or videographer piloting the drone a greater sense of creative ownership of the video recording because it will not be a strictly programmed or mechanical operation.

In another implementation of the technology, deviations from or adjustments to a predetermined flight plan made as the drone is flying the flight path may be saved for later reuse. The adjustments may be saved by themselves (to be added to a predetermined flight path), or the flight path and the adjustment may be saved together as an entirely new flight path. In this way, multiple adjustments to a particular predetermined flight path may be layered onto the flight path enabling the ability to create flight plans of increasing complexity or variation. For example, a flight path may be re-flown multiple times with a different camera orientation operation each time to compare and contrast a variety of perspectives.

In an implementation of the technology, the drone or UAV may be docked at a location remote from the pilot. Pilots typically fly drones by maintaining line of sight to the drone in accordance with FAA rules governing drone flight. However, in certain circumstances the pilot may navigate the drone relying on the drone's first-person view, that is, by seeing what the drone camera sees, without having line of sight to the drone. This manner of flying a drone is generally only permissible in certain limited situations, such as indoor flight in a large warehouse or stadium.

The autopilot of the drone receives and integrates a number of internal and external operational inputs governing the flight of the drone in order to issue a command to the drone microprocessor. These commands are received by the microprocessor as if they had been issued by the (human) pilot and as such are issued by the autopilot as ostensible joystick commands. The autopilot integrates the computed or programmed flight path of the drone with sensor data relevant to drone operation, such as wind speed and direction data. The autopilot may also receive joystick input when the pilot issues a command via the joystick on the remote control. Joystick input is interpreted according to the particular functionality assigned to the joystick during autopilot operation. For example, the joystick may be used to change the pitch or yaw of the drone during programmed operation to change the view of the onboard camera. A governing function may be applied to the joystick input which can dampen or limit the input so that the drone does not exceed an operational envelope for its flight operation. The drone autopilot may also receive inputs from a collision avoidance system or from a subject tracking system. Based on input from these various sources, the autopilot computes and issues ostensible joystick commands to the drone microprocessor. In response to receiving an ostensible joystick command from the autopilot, the microprocessor transmits a flight command to the drone electromechanical propulsion system causing the drone to fly according to the autopilot's command.

Returning to the cycling race example, during programmed operation, the drone pilot may command the drone to change its orientation during flight to obtain a view of the crowd of spectators along the race route or of a particularly notable vista in the distance. Alternatively, the pilot may change adjust the operation of an onboard camera such as by zooming out for a wide angle shot of a distant mountain range or zooming in for a close-up of a cyclist. When the pilot ceases to modify the drone flight or operation, the autopilot will receive input from the joystick corresponding to a return to its neutral position, which will in turn effect a smooth return to its programmed or computed flight plan.

Referring now to the drawings, FIG. 1 illustrates an unmanned aerial vehicle (UAV 101) and its components, represented by operational architecture 128. Operational architecture 128 broadly includes a flight controller subsystem 124, an electromechanical subsystem 126, external operational inputs 120, and internal operational inputs 122. Flight controller subsystem 124 may include a circuit board housing one or more microprocessors, also known as a flight controller, that controls various aspects of drone operation. Electromechanical subsystem 126 may include an electronic speed controller unit and various rotors, power supplies, and the like.

The external operational inputs can include inputs received from a remote control, typically operated by a human pilot, and sensor data measuring environmental conditions affecting UAV operation. Internal operational inputs can include programmed or computed flight or operation plans which direct drone position, drone orientation, or sensor operation in flight, and other information relating to the particular use or capabilities of the UAV, such as map or topographical data.

Figure 2:
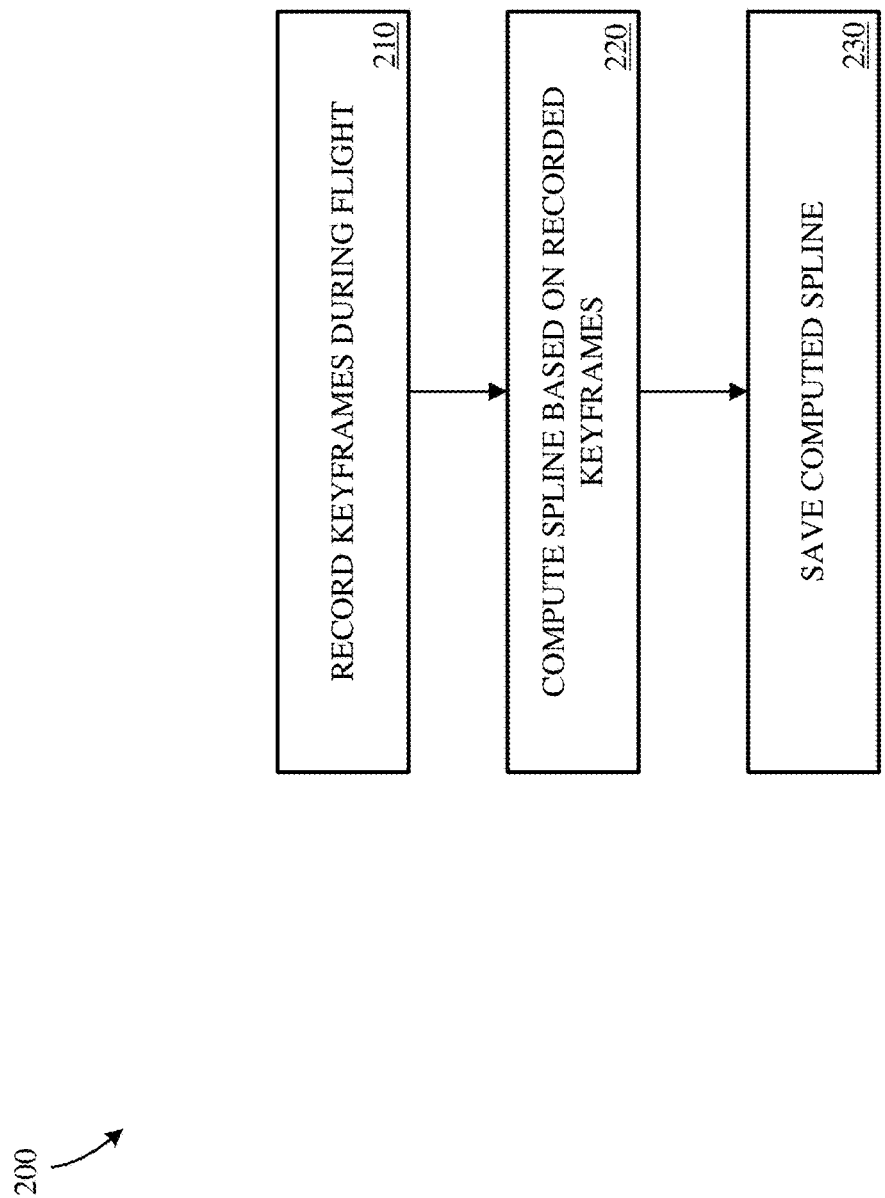
FIG. 2 illustrates a method of operation of a UAV to create a spline in an implementation.

FIG. 2 illustrates process 200 implemented by one or more components of flight control subsystem 124 of UAV 101. Process 200 is implemented in program instructions that, when executed by the one or more hardware and/or firmware elements of flight control subsystem 124, direct it to operate as follows. As UAV 101 is in flight, flight control subsystem 124 of UAV 101 records one or more keyframes (step 210). The pilot of UAV 101 may direct UAV 101 to record the keyframes based on the first-person view the pilot sees on remote control 130. Recorded keyframe data may include parameters such as the physical location of the drone in based on visual tracking or based on three-dimensional coordinates and the orientation of the drone at that location. Keyframe data may also include data relating onboard camera or sensor operation at the keyframe location. Flight control subsystem 124 of UAV 101 computes a flight path or computed spline which connects the keyframes (step 220). The flight path may be computed by the onboard microprocessor using a set of discrete location points or waypoints identified by the pilot during the present or a prior flight. The flight control subsystem of UAV 101 saves the computed spline for subsequent use (step 230).

The computed spline may be re-flown by UAV 101 or, for example, by a back-up drone while UAV 101 is being recharged. The computed spline may be saved locally, such as in onboard persistent memory or data storage. Also, it may be saved remotely, as in the data storage of a device in communication with the drone such as the remote control or a laptop computer receiving transmissions from the drone. This may also include, for example, remote cloud data storage. In a future flight of the saved spline, a pilot may make modifications to the flight, for example, to make incremental improvements to the drone's operation, to make temporary adjustments based on unforeseen conditions, or to explore different ways of operating the drone. These modifications may be similarly saved.

Figure 3:
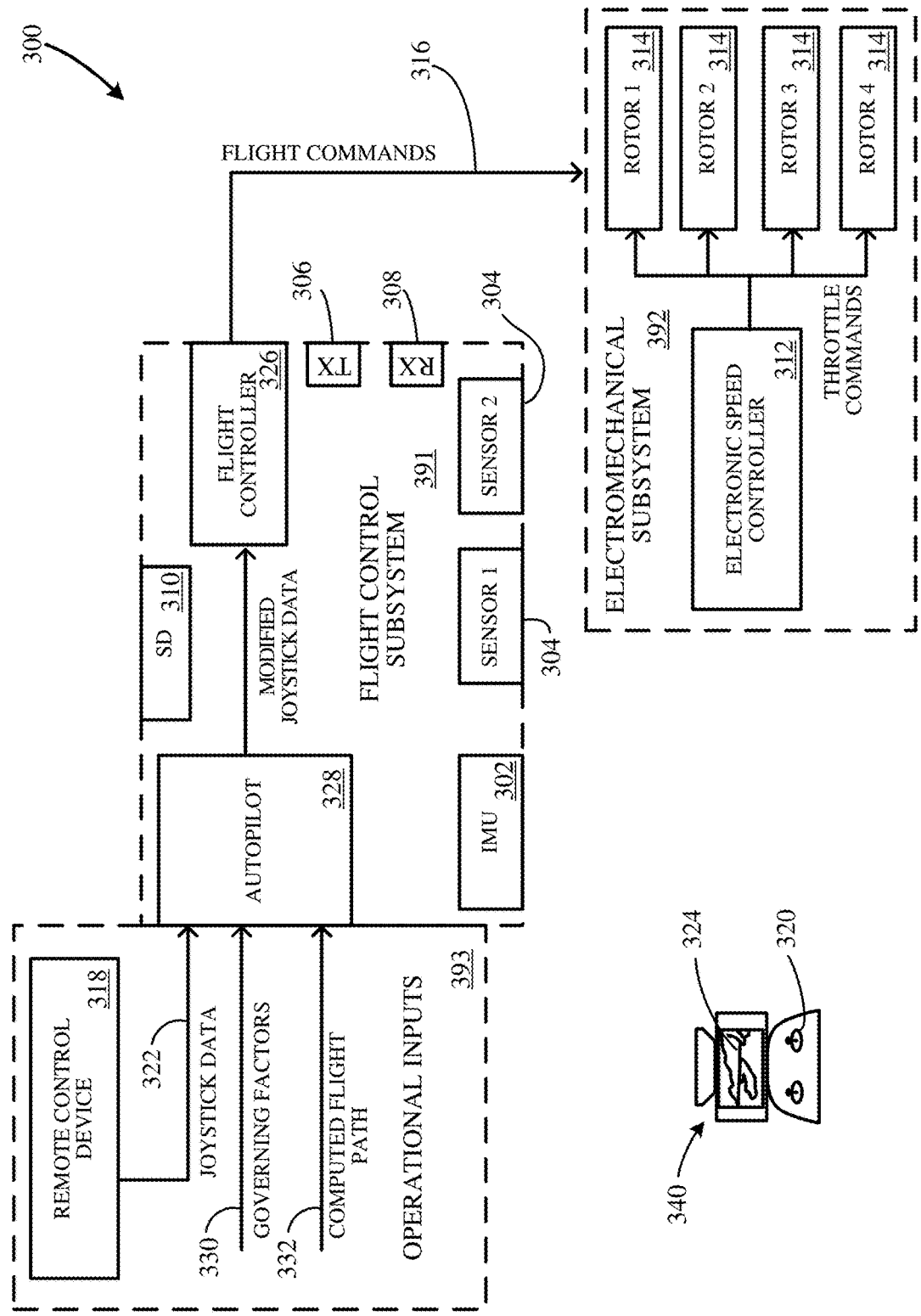
FIG. 3 illustrates a detailed diagram of UAV systems in an implementation.

FIG. 3 shows an exemplary systems architecture 300 of quadcopter 401 of FIG. 4. Systems architecture 300 includes a flight control subsystem 391 and an electromechanical subsystem 392. Flight control subsystem 391 includes an autopilot function (represented by autopilot 328, a flight controller 326, an inertial measurement unit 302, sensors 304, a transmitter 306, a receiver 308, and a memory card port 310. Electromechanical subsystem 392 includes an electronic speed controller 312, and rotors 314. It may be appreciated that both flight control subsystem 391 and electromechanical subsystem 392 may include other elements in addition to (or in place of) those disclosed herein, which are illustrated for exemplary purposes. Systems architecture 300 also includes operational inputs 393. Operational inputs 393 include joystick data 322 supplied by a remote-control device 318, as well as governing factors 330 and a computed flight path 332.

Inertial measurement unit 302 includes one or more sensors such as a gyroscope and an accelerometer which provide movement and orientation data to the flight controller subsystem. In some implementations, the flight controller subsystem may also connect to or contain other sensors 304 such as video cameras, Global Positioning System (GPS) sensors, magnetometers, or barometers. UAVs also carry equipment for wireless communication, such as antennas, video transmitter 306, and radio receiver 308, which enable communication with remote control 340 by which a human pilot sends commands such as flight commands or commands relating to onboard sensor operation. The remote control may be a dedicated device, or it may be an application on a mobile computing device such as a smart phone, tablet or laptop computer capable of wireless communication with UAV 401. Wireless communication between the remote control and the UAV may be carried over a WiFi network or Bluetooth® link. The flight controller subsystem may also connect to onboard persistent or nonvolatile memory or memory card port 310 for recording flight and sensor operations and data. As part of UAV 401's electromechanical subsystem, electronic speed controller 312 is connected to the flight controller subsystem and controls the operation of rotors 314 according to flight commands 316 received from the microprocessor on the flight controller subsystem.

Remote control 340 for drone 401 contains the wireless communication hardware for communicating with drone 401 as well as throttle device (for example, a physical or virtual joystick) 320 for manually controlling the flight (i.e., speed and direction) of drone 401. For example, when the pilot moves joystick 320, remote control 340 will transmit joystick data 322 to UAV 401. While a pilot can control drone 401 based on his or her line of sight to the drone, remote-control devices for drones typically have display screen 324 to display the perspective of an onboard camera, referred to as the first-person view. First-person view capability enables the pilot to find and capture views from remote or difficult-to-access vantage points.

Figure 4A:
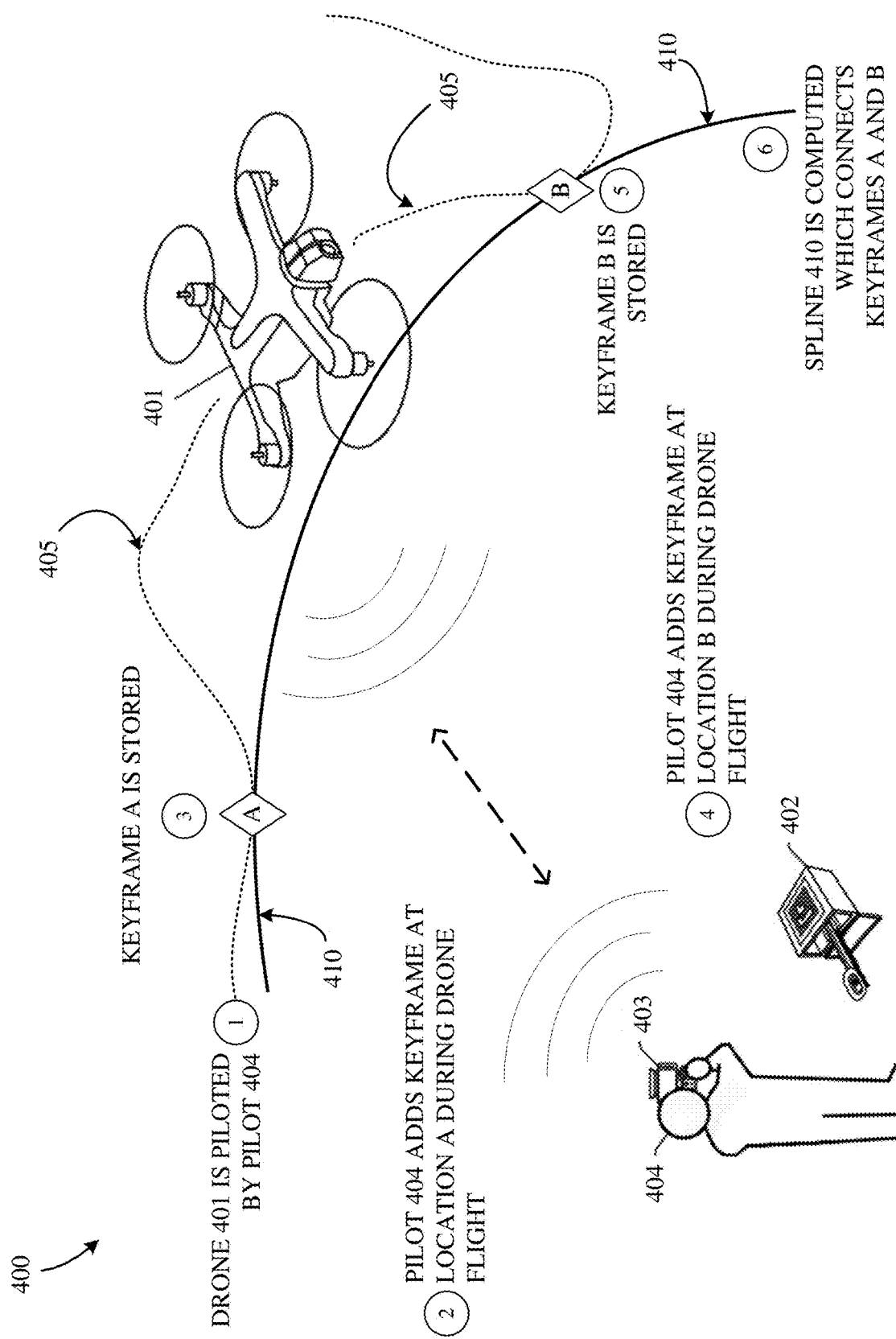
FIG. 4A illustrates an operational environment and exemplary scenario.

Exemplary operational environment 400 of FIG. 4A illustrates the process of creating a computed spline flight path. Pilot 404 has initiated flight of drone 401 with the drone launching from drone docking device 402. Drone dock 402 gives drone 401 localization information at the start of a flight so that drone 401 can ascertain its position relative to dock 402 during flight. Drone flight may be manually controlled by pilot 404 using remote control 403 which is in wireless communication with UAV 401. The pilot may use joystick 320 to turn or accelerate drone 401. Remote control 403 transmits pilot 404's input received from joystick 320 to drone 401 via onboard receiver 308 coupled to flight controller 326. Flight controller 326 translates the pilot's input into flight commands 316 issued to electronic speed controller 312, which in turn throttles rotors 314 accordingly.

In the sequence of events shown in FIG. 4A, drone 401 is piloted by pilot 404 along an arbitrary route 405 (event 1). At event 2, pilot 404 identifies a location to be saved for the spline at point A. Pilot 404, using remote control 403, adds a keyframe at the location as the drone flies. This step may be implemented, in an aspect of the technology, using a virtual button object displayed on a touchscreen of remote control 403. Keyframe A along with flight and/or operational data associated with location A are saved in event 3. Keyframe data that is stored at event 3 includes location coordinates (for example, GPS coordinates or coordinates relative to dock 402), and may also include drone 401's speed at location A, orientation at location A, as well as data concerning the operation of the onboard camera. Keyframe data may be saved in data storage on remote control 403, or it may be saved in data storage onboard drone 401. The flight continues. Upon reaching location B, Pilot 404 adds another keyframe (event 4). Keyframe B is saved in event 5 in a manner similar to event 3. In event 6, spline 410 is computed which connects keyframes A and B. The spline computation may be carried out in an onboard processor of drone 401 or in a processor of remote control 403 which is then transmitted to drone 401. For the sake of clarity, for this example the spline computation is carried out by a processor of the onboard flight control subsystem of drone 401.

Figure 4B:
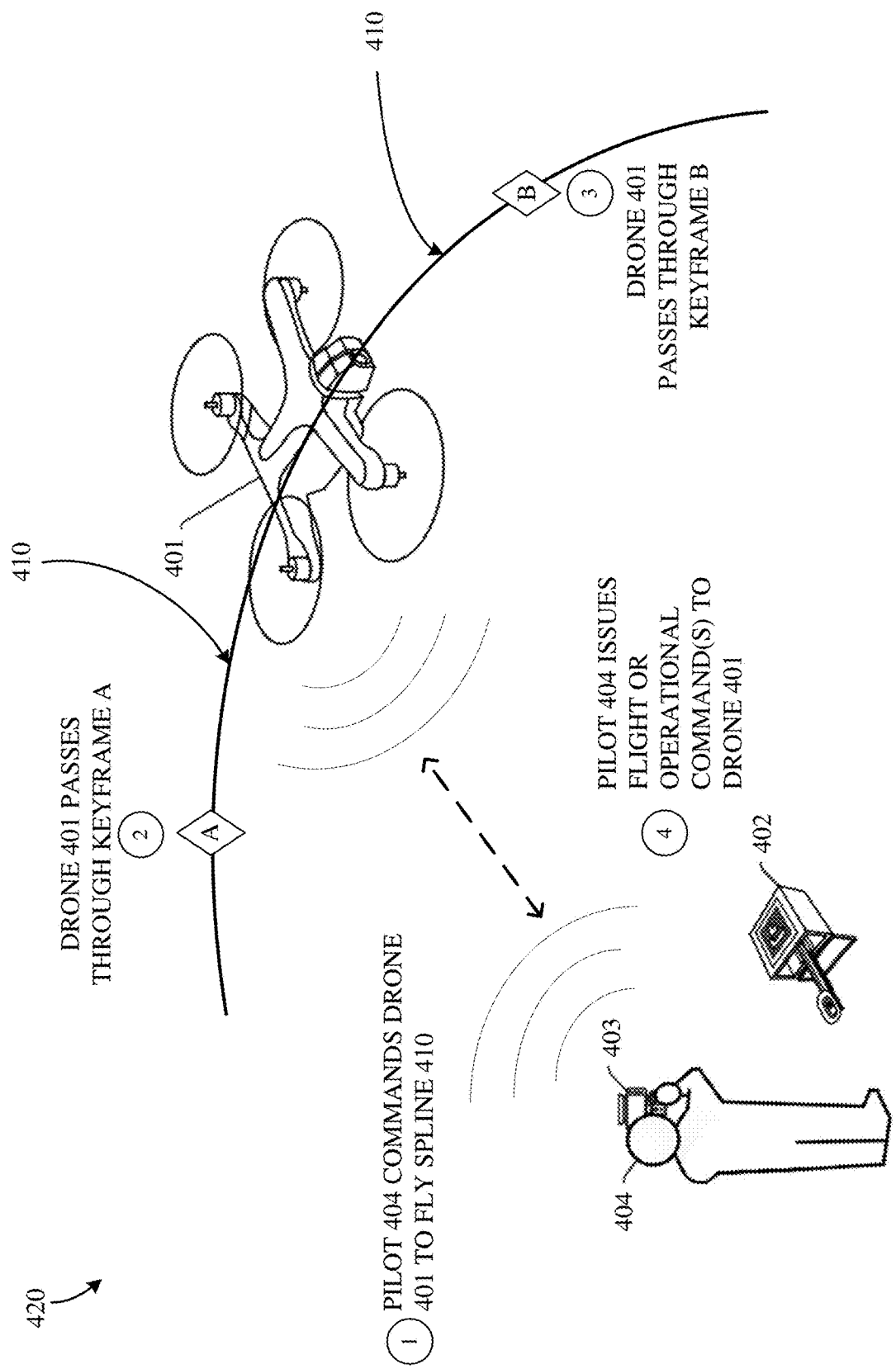
FIG. 4B illustrates an operational environment and exemplary scenario.

FIG. 4B illustrates drone 401 of operational environment 400 in flight subsequent to the recording of keyframes "A" and "B" and the computation of spline 410. Keyframes "A" and "B" and spline 410 may have been saved to the onboard data storage of drone 401, or the keyframes and spline may be uploaded to drone 401 before or during the current flight from a remote device storing the information, such as remote control 403. In event 1, pilot 404 commands drone 401 to play back spline 410. In event 2, drone flies spline 410. As drone 401 flies spline 410, it is operating under the control of its onboard autopilot which is part of drone 401's flight control subsystem. In events 2 and 3, drone 401 passes through locations A and B, respectively, that were stored as keyframes and are points on spline 410. As drone 401 plays back spline 410, pilot 404 may issue flight or operational commands to alter its operations under the command of the autopilot. For example, pilot 404 may command drone 401 to make a departure and return to spline 410; to speed up, slow down, or stop and hover at a location on spline 410; or to reverse direction along 410. Pilot 404 may command drone 401 face north as it flies, rather than facing forward along the spline. Pilot 404 may add additional keyframes to spline 410. Pilot 404 may operate the drone camera as the autopilot navigates drone 401 along spline 410.

Figure 5A:
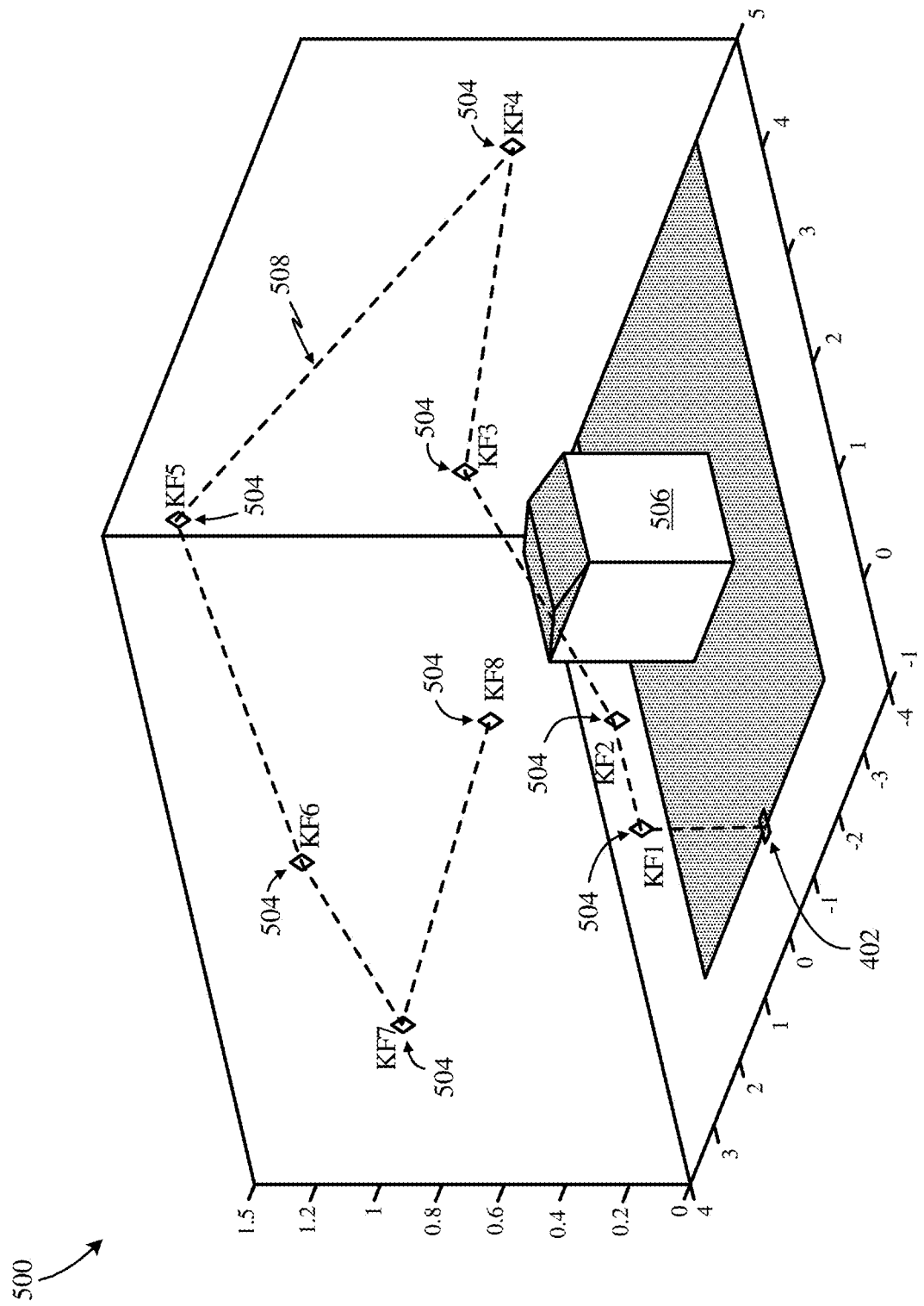
FIG. 5A illustrates an exemplary UAV flight path.

UAVs can be commanded to fly predetermined flight paths. A flight path may be defined by discrete sets of position data (and optionally velocity data) called waypoints. Waypoints may be specified in three-dimensional Cartesian coordinates. Waypoints may be chosen for different purposes: some waypoints may be locations where the drone is intended to stop and view a point of interest, while others may specify the precise position a drone must attain in order to pass through, say, a door or window.

Where drones are used for videography, the pilot may use keyframes to identify the desired shots. View 500 of FIG. 5A shows eight exemplary keyframes 504 chosen to view the exterior of building 506 from aerial positions. Each keyframe 504 is a static record of a waypoint along with the orientation of drone 101 (that is, the orientation of drone 101's onboard camera) at that waypoint so that the desired vantage point can be recaptured at different times. Drone orientation refers to the angular position of drone 101 relative to forward-facing level flight, namely pitch 112, roll 110, and yaw 114 angles as show in FIG. 1. While viewing a scene captured by a drone camera at a waypoint, a pilot can capture a panorama by varying the drone's yaw angle to the left and right of its forward-facing position. Similarly, the camera tilt can be changed by varying to the drone's pitch angle. For example, a videographer piloting a drone may desire to capture a construction site from an elevated vantage point looking downward during different phases of construction to document the progress of the work. This technique is also useful for before-and-after comparisons of the development of an expansive area or of the reconstruction of an area after a natural disaster.

Drone 101 can record a particular location in three-dimensional space while in flight by recording sensor or telemetry data about the location such as the drone's distance and orientation from drone dock 402, GPS data gathered from an onboard GPS sensor 304, visual data gathered from an onboard camera 304, or combinations thereof. Similarly, the orientation of drone 101 at a particular location can be recorded and stored using data from inertial measurement unit 302.

One technique for programming the flight of a UAV is to record a sequential set of keyframes 504 which will define the flight path and video operation of drone 101. For example, when checking of a security perimeter, a pilot may define a set of keyframes capturing every point of entry of a building. The operating system of drone 101 will then compute a flight path for drone 101 and its orientation during flight from one keyframe to the next. In subsequent flights, the pilot can deploy drone 101 to fly the same route and capture the same views each time, making it easier to identify when something has changed.

An alternative to recording a sequential set of static keyframes 504 to define a flight path and video operation is to record a continuous keyframe: the flight path and video operation of a first flight are continuously recorded over a period of time. A flight that has been recorded as a continuous keyframe can be subsequently re-flown as needed. Because a continuous keyframe will record all motion, including any jerky or irregular movement or other idiosyncrasies associated with manual flight control, this mode of operation may be more appropriate for experienced drone pilots or those with more competent flying skills.

When computing a flight path based on a set of static keyframes, the computation of the route from one keyframe to the next is a mathematical operation known as spline interpolation. Spline interpolation is a method of fitting a curve to a set of points by computing a piecewise set of lower-order polynomials or splines over sequential pairs of points such that the resulting function is continuous and smooth over its domain. It is a simpler and more stable method than polynomial interpolation which involves fitting a single higher-order polynomial to all of the points in a set.

In a basic implementation of spline interpolation, the path between any two points in three-dimensional space will be a straight line. Connecting sequential pairs of points with straight lines will produce a continuous path in a shape akin to a polygon. When using this method to create a flight plan, the resulting set of connected straight lines will have abrupt changes in direction at the points. FIG. 5A demonstrates an exemplary flight path 508 comprising straight line segments defined by a set of eight keyframes 504 at various locations around building 506. Such sharp turns are not only aesthetically undesirable for cinematography, they may be dynamically unfeasible, that is, they may exceed the flying capability of drone 101.

Figure 5B:
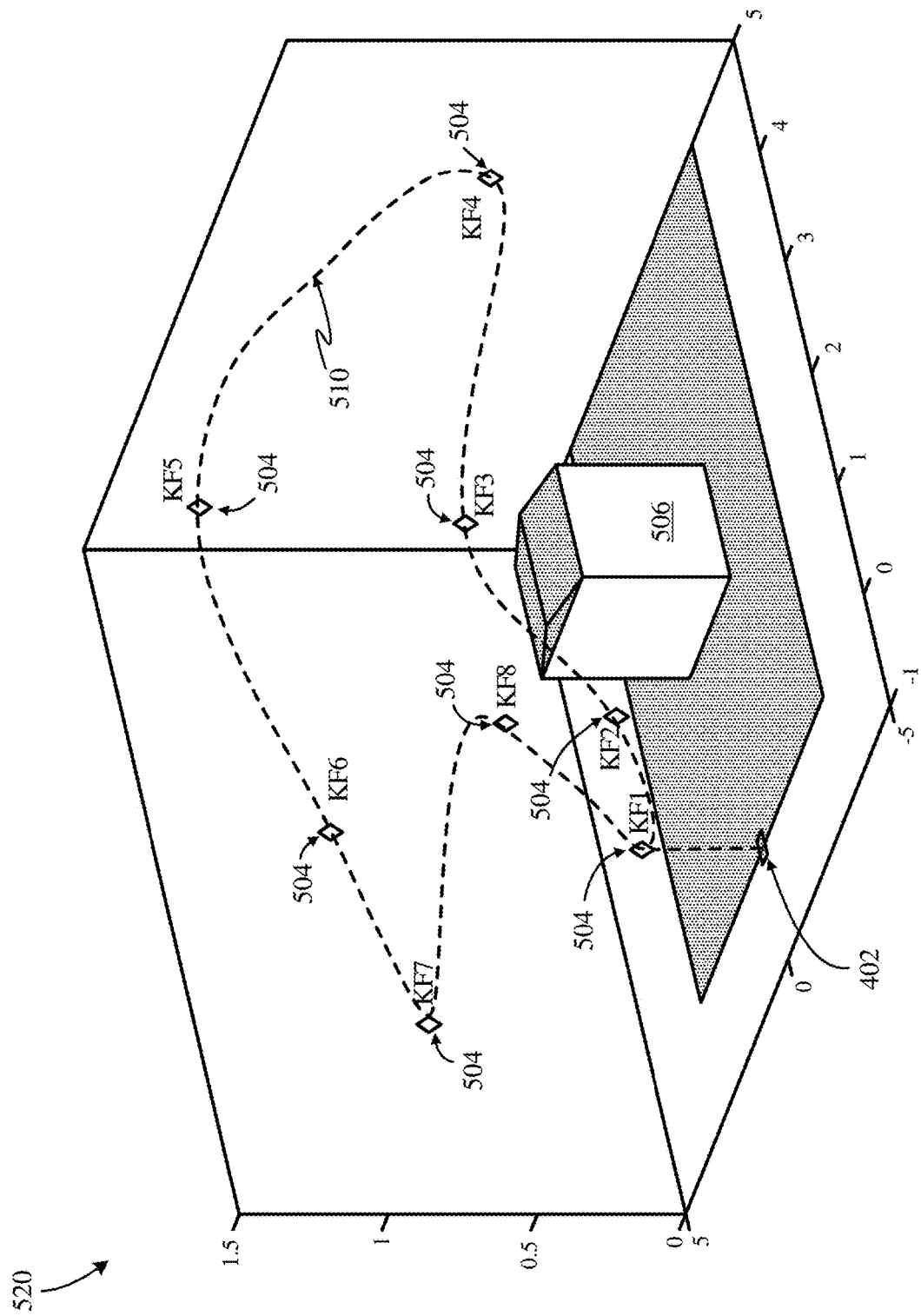
FIG. 5B illustrates an exemplary UAV computed flight path circling a building.

However, higher order splines can connect a set of sequential points with a curve that is better suited for drone flight. To wit, a set of cubic polynomials are generated across sequential pairs of points with the requirement that the polynomials be twice continuously differentiable, which is to say, continuous and smooth when pieced together. Smoothness is defined mathematically by requiring lower order differentials be equal at the knots (i.e., points where the functions are pieced together). For cubic splines, smoothness requires that both the tangency and curvature of the functions be equal at the knots which will eliminate sudden changes in velocity and acceleration. Thus, a curve generated in this way produces a flight path that is aesthetically pleasing for cinematography as well as dynamically feasible for drone operation. Further, cubic splines will satisfy an additional constraint for drone flight and cinematography which is that the third- and fourth-order differentials of the interpolant with respect to time, known as jerk and snap, be zero. View 520 of FIG. 5B illustrates flight path 510 through the same keyframes 504 of FIG. 5A but connected with a cubic spline interpolant. Spline interpolation calculations can be done on the fly, so to speak, as the pilot adds or deletes keyframes in the sequence. Further, varying the constraints on the waypoints or endpoints can alter the character of the calculated curve which in turn will affect the dynamic character of the flight path.

When a drone is recording video while flying along a computed flight path, the orientation of drone 101 can be programmed to provide a smooth and steady video recording, eliminating any uneven camera motion or direction changes that can occur during manual camera operation and allowing camera operation to be subsequently recaptured once a preferred orientation program is found. In a process that is similar to the process of interpolating a flight path across a set of waypoints, a drone orientation function can be interpolated to provide smooth drone operation along the flight path using the drone orientation data (i.e., pitch 112, roll 110, and yaw 114 angles) specified at the waypoints. And just as a continuous keyframe records the position of drone 101 over a period of time during a first flight, the orientation of drone 101, and thus of its camera or other sensors, can also be recorded during the first flight for later reuse.

In an implementation of the present technology, during programmed drone operation, a pilot may desire to modify the video recording or other sensor data gathering while drone 101 is in flight by making minor, transitory changes to the UAV's position or orientation without terminating the programmed operation of the UAV. The pilot may issue a flight or operational command via joystick 320 on remote control 130 which is transmitted to the drone's flight controller subsystem. Upon receiving the new joystick data, the flight controller subsystem will modify the flight commands that it issues to electronic speed controller 312 based on its computing a modification to computed spline 510, continuous keyframe path, or programmed flight path. The modification will factor in one or more factors governing drone flight such as environmental conditions (e.g., wind speed and direction) or obstacle detection and avoidance. For example, upon identifying a set of keyframes and interpolating a flight path, should the interpolation yield a path passing through a tree, proximity sensors aboard the drone will detect the tree, and the drone will compute a modification to the spline to go around the tree and return to the spline.

Figure 6A:
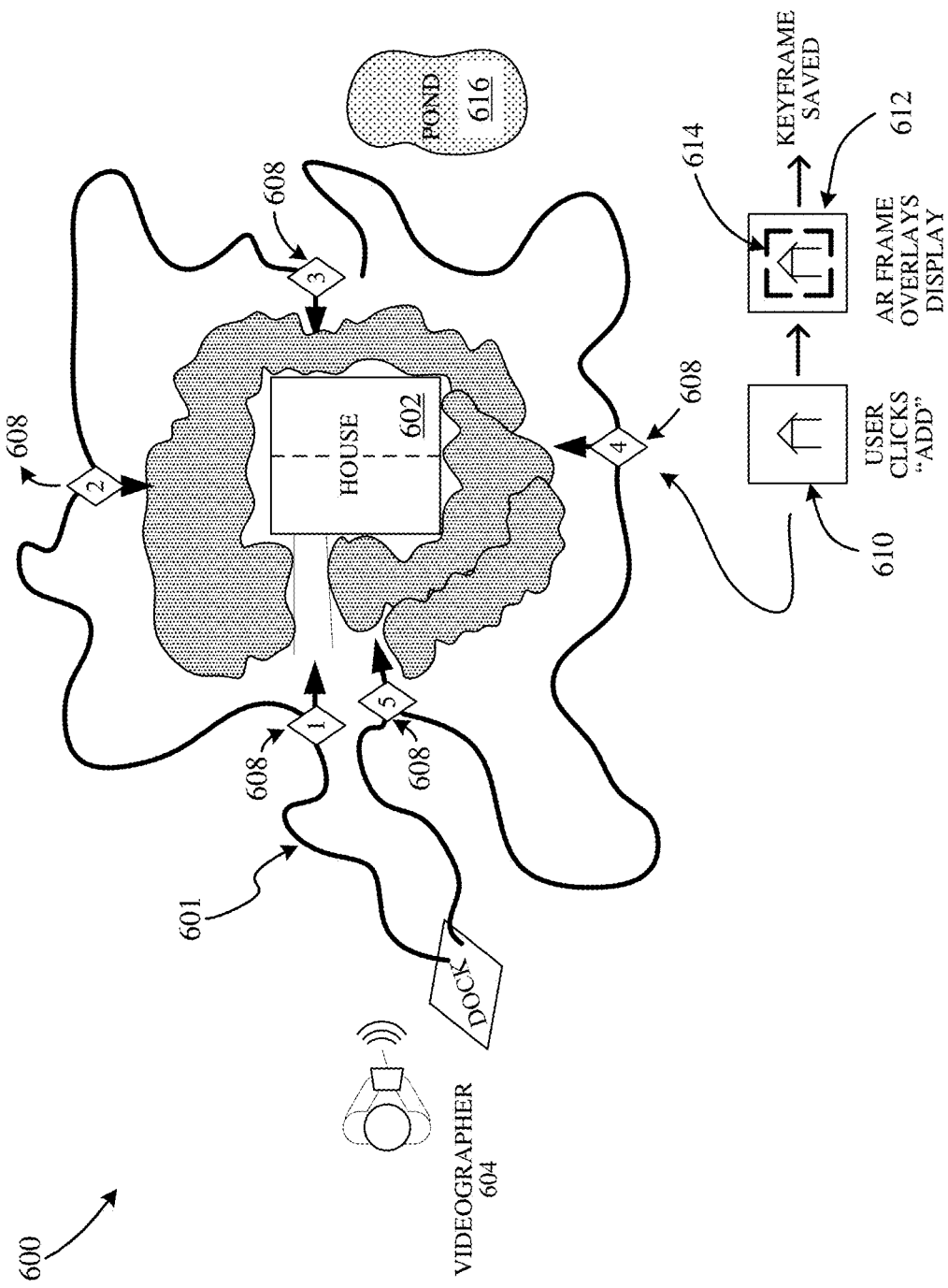
FIG. 6A illustrates an exemplary overhead view of flying a UAV around a house.

In an exemplary usage shown in overhead view 600 of FIG. 6A, a realtor desires to provide a video recording of residential property 602 from an external aerial perspective for marketing purposes. A drone system with videography capability comprising drone 101 and videographer 606 who flies drone 101 using remote control 130 is dispatched to make the recording. In first flight 601 shown in FIG. 6A, videographer 606 flies drone 101 around house 602, selectively chooses a set of particularly desirable vantage points, and saves that information as a set of five keyframes 608 which include the drone position and drone orientation information at each keyframe. Exemplary display screens 610 and 612 for identifying and adding keyframes to a set are shown in FIG. 6A, where augmented reality imagery 614 can be superimposed on the first-person view to precisely identify a camera shot associated with a keyframe.

Figure 6B:
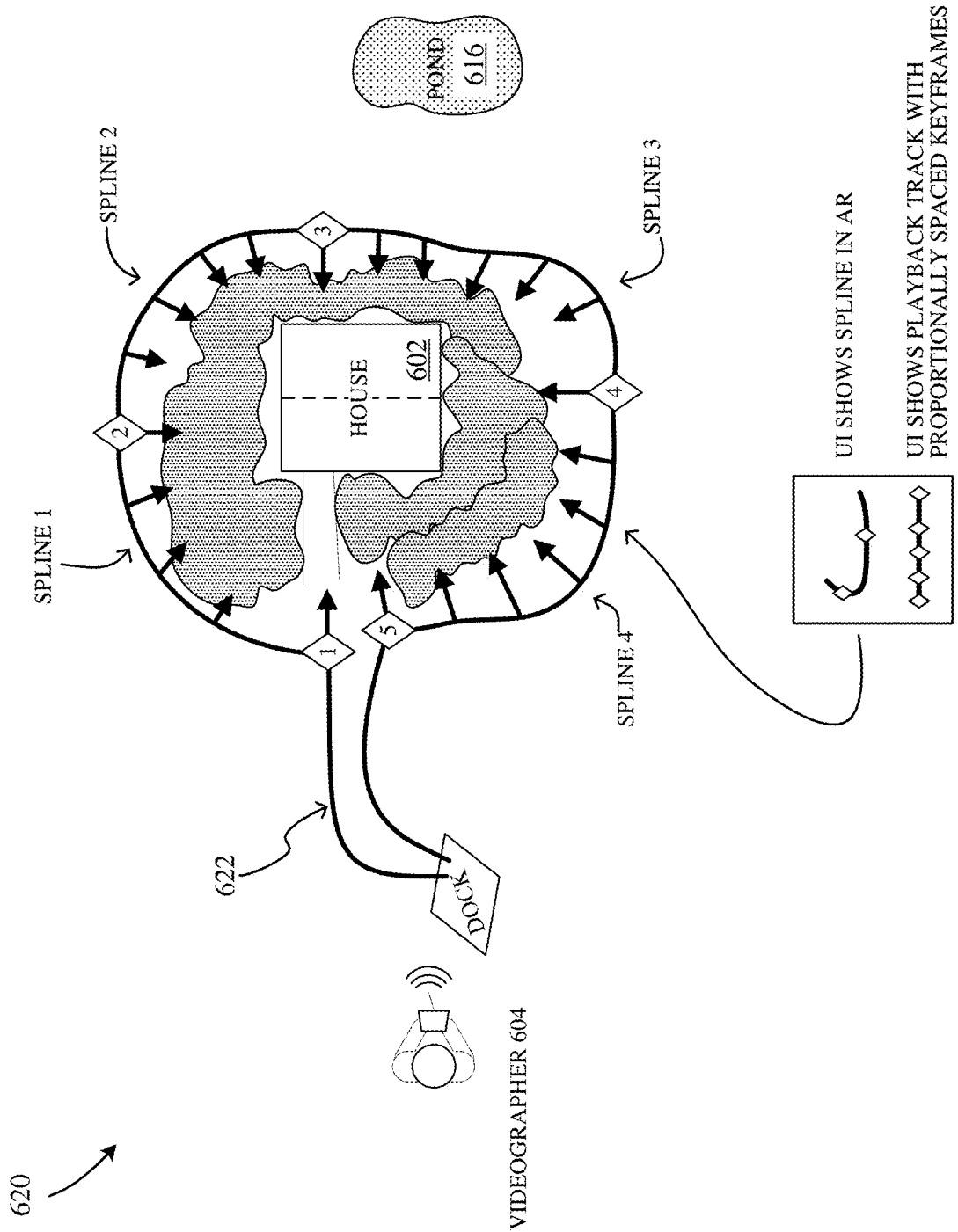
FIG. 6B illustrates an exemplary overhead view of a computed spline flight path.

For subsequent flights, flight controller subsystem 124 computes via spline interpolation flight path 622 as shown in overhead view 620 of FIG. 6B. Drone 101 flies flight path 622 determined by the interpolant and records a video of the entire perimeter of the house 602 including the particularly desirable vantage points of keyframes 608.

Figure 6C:
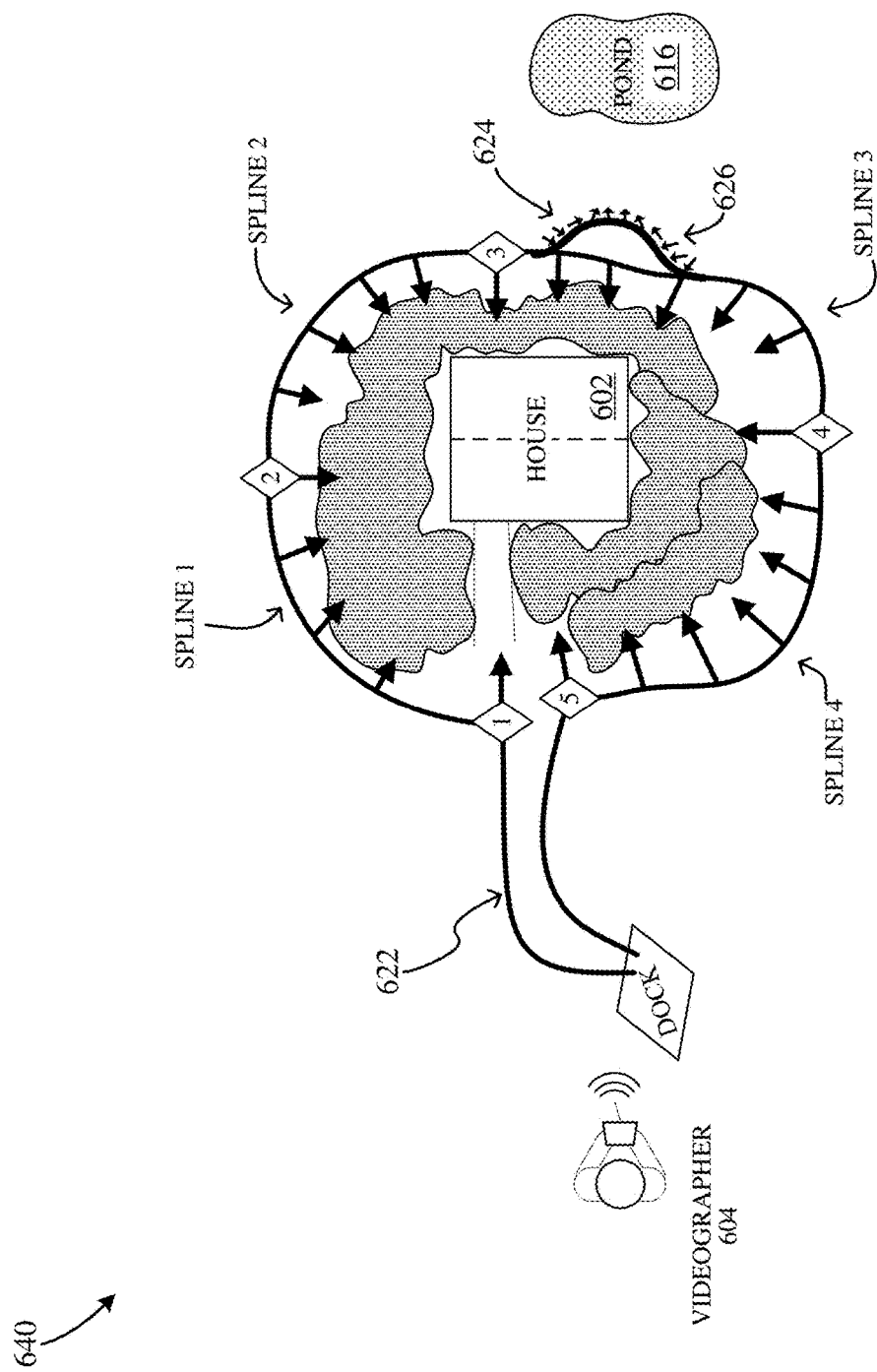
FIG. 6C illustrates an exemplary overhead view of a computed spline flight path with a modification to flight path and drone orientation.
Figure 6E:
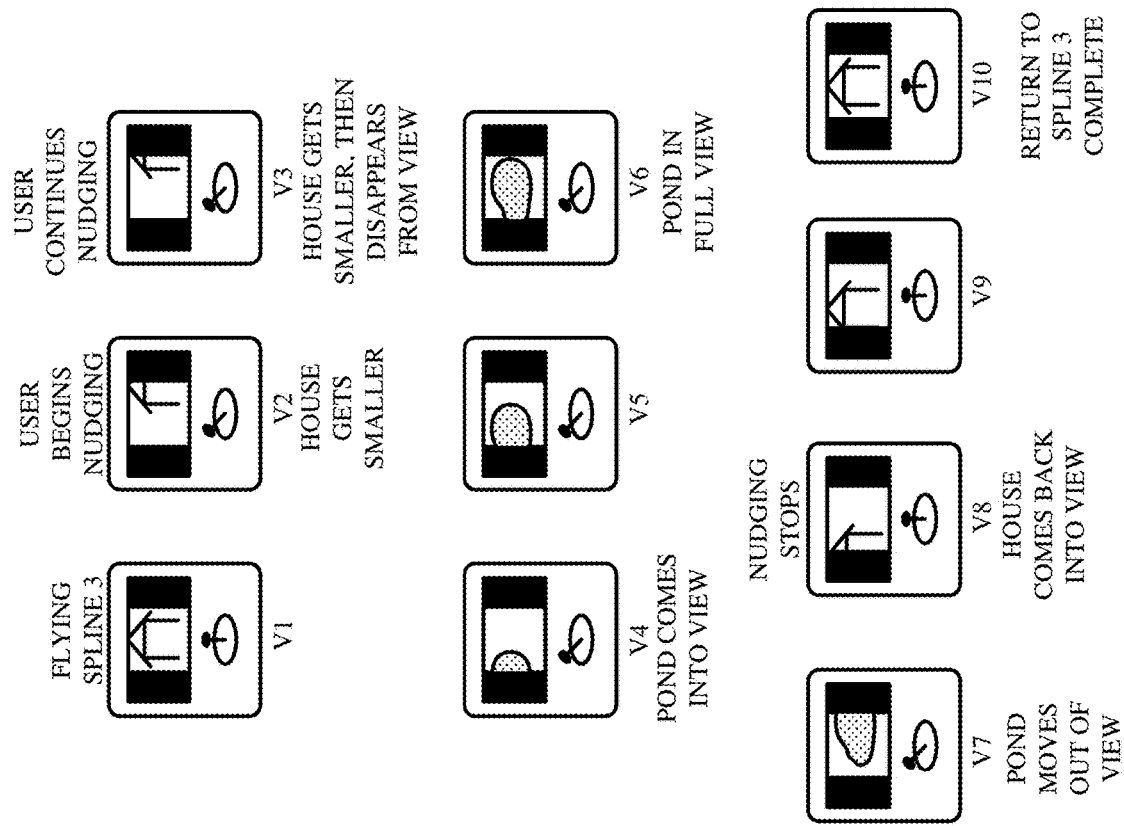
FIG. 6E illustrates an exemplary display on a remote control with first-person view as the pilot issues flight commands during flight along computed flight path.
Figure 6D:
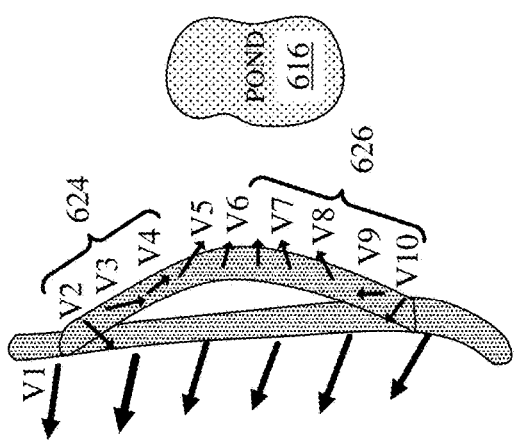
FIG. 6D illustrates an exemplary close-up overhead view of a modification to flight path and drone orientation during flight along computed flight path.

Continuing this exemplary usage, let us suppose that in a subsequent flight, the realtor desires to include a shot of pond 616 behind house 602 in the video recording. Rather than record a new set of keyframes around house 602, during drone 101's flight around the property on the computed splines, videographer 604 modifies the drone operation during the flight on computed spline 622. As shown in overhead view 640 of FIG. 6C, videographer 604 issues a command using joystick 320 which causes drone 101 to move slightly leftward 624 from computed spline 622 and to turn the camera away from house 602 and toward pond 616. After achieving the desired recording, videographer 604 allows joystick 320 to return to its neutral position and drone 101 continues its flight having computed a return path 626 to the computed spline 622 and a reorientation to the orientation spline. A close-up view of the computed modification to flight path 622 including departure 624 and return 626 and drone orientation indicated by arrows are shown in FIG. 6D. FIG. 6E demonstrates an exemplary first-person view of drone 101 as seen on display screen 324 of remote control 130 at a series of points V1 through V10 before and during the modification of its flight along flight path 622 according to the flight commands issued by videographer 604.

Figure 7:
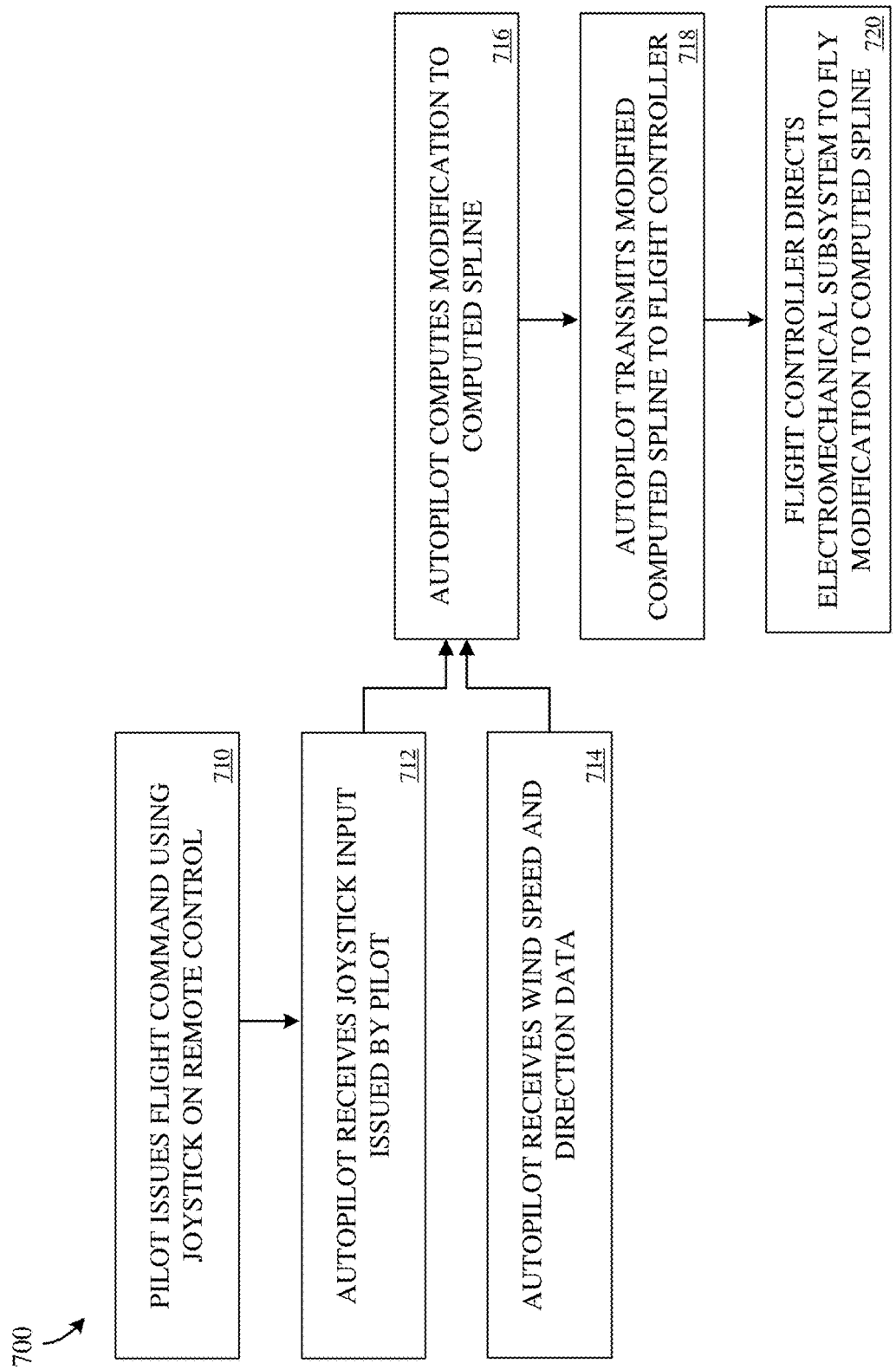
FIG. 7 illustrates an exemplary workflow when a pilot issues flight commands as a drone flies by autopilot control.

FIG. 7 illustrates process 700 implemented by one or more components of flight control subsystem 124 of UAV 401. Process 700 is implemented in program instructions that, when executed by the one or more hardware elements of a flight control subsystem onboard drone 401, direct it to operate as follows. A drone pilot uses joystick 320 to modify the flight of drone 401 along a computed spline (step 710), where the modification may affect the position or the orientation of the drone, or some combination thereof. The joystick data is wirelessly transmitted from remote-control device 403 to autopilot 328 of drone 401 (step 712). Autopilot 328 also receives external operational inputs (i.e. wind speed and direction data) affecting drone flight (step 714). Autopilot 328 computes a modification to the computed spline (step 716). In event 718, this modification is transmitted to flight controller 326, which, in event 720, directs the drone electromechanical subsystem of drone 401 to fly according to the modification to the computed spline (step 718). The electromechanical subsystem issues a flight command that simulates an actual joystick command, in other words, it issues a synthetic or modified joystick command 330 (step 720). Modified joystick command 330 includes the pilot's input together with factors that govern drone operation. In another implementation of the present technology, a pilot can command multiple simultaneous modifications to the flight during programmed operation using a remote control with multiple joysticks, with each joystick assigned a particular aspect of drone operation or by assigning multiple functionalities to a single joystick. For example, considering the two joysticks shown in FIG. 1, input from one joystick may control drone yaw angle 114 while the other controls drone pitch angle 112, giving the pilot the ability to focus on fine-tuning camera operation while the drone flies autonomously along the predetermined flight path.

In another implementation of the present technology, a governing factor may transform an actual joystick command into a modified joystick command by applying a dampening function to the actual joystick input or data. In one aspect of the technology, the dampening function may be a mathematical model that simulates the response of a spring-rigged object subject to a force corresponding to the actual joystick input. More specifically, the spring-rigged model translates a real-time input by the pilot using the joystick into the response of a simulated object rigged with three linear and three torsional overdamped springs subjected to displacement in one or more directions. One result of applying the dampening function to the pilot's joystick input will be an attenuated input to the drone which prevents an abrupt dynamic response in the velocity or orientation of the drone, resulting in a modification to the computed spline which maintains its cinematographically desirable character. Another result of a dampening function such as a spring model is that if the pilot releases the joystick allowing it to return to its neutral position, the drone will receive and transform that joystick input into a modified joystick input which gradually reduces the modification to zero, which effects a smooth return to the spline. Similarly, where the pilot uses the joystick to reorient the drone to face a direction that is different from that determined by the orientation spline (rather than to move the drone off the computed spline), the joystick input will be dampened to avoid an abrupt dynamic response in reorientation, resulting in a more desirable response for cinematographic purposes.

Figure 8:
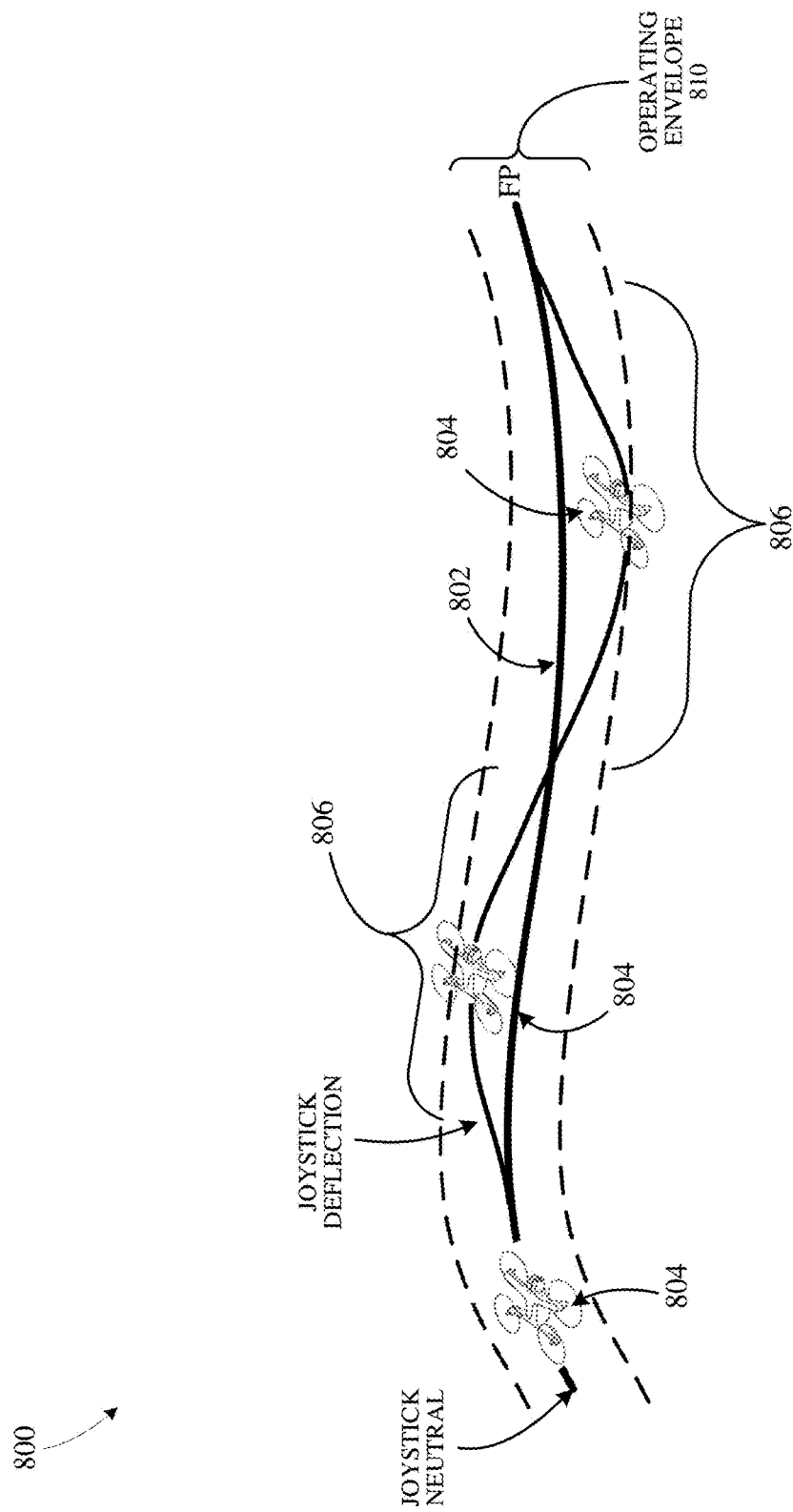
FIG. 8 illustrates an exemplary overhead view of effect of pilot commands on drone flight by autopilot along computed flight path.

In yet another implementation of the present technology, the application of a dampening function can effect a limit on modifications to the computed spline or other predetermined flight operation of the drone. This limitation on the dynamic response of the drone to any input by the pilot creates operating envelope around the drone's computed or predetermined flight path. For example, in the exemplary overhead view shown in FIG. 8, using joystick data filtered through a dampening function, the pilot can cause drone 804 to make small deflections 806 from flight path 802 as it flies flight path 802. The dampening function applied to the pilot's flight commands creates operating envelope 810 about flight path 802. The autopilot of drone 804 continues to provide operational instructions to the electromechanical subsystem, while taking into account the joystick data it receives from the remote control. Thus, the pilot can focus his or her attention on a particular aspect of the drone operation without having to assume full control of the drone's operation.

Figure 9:
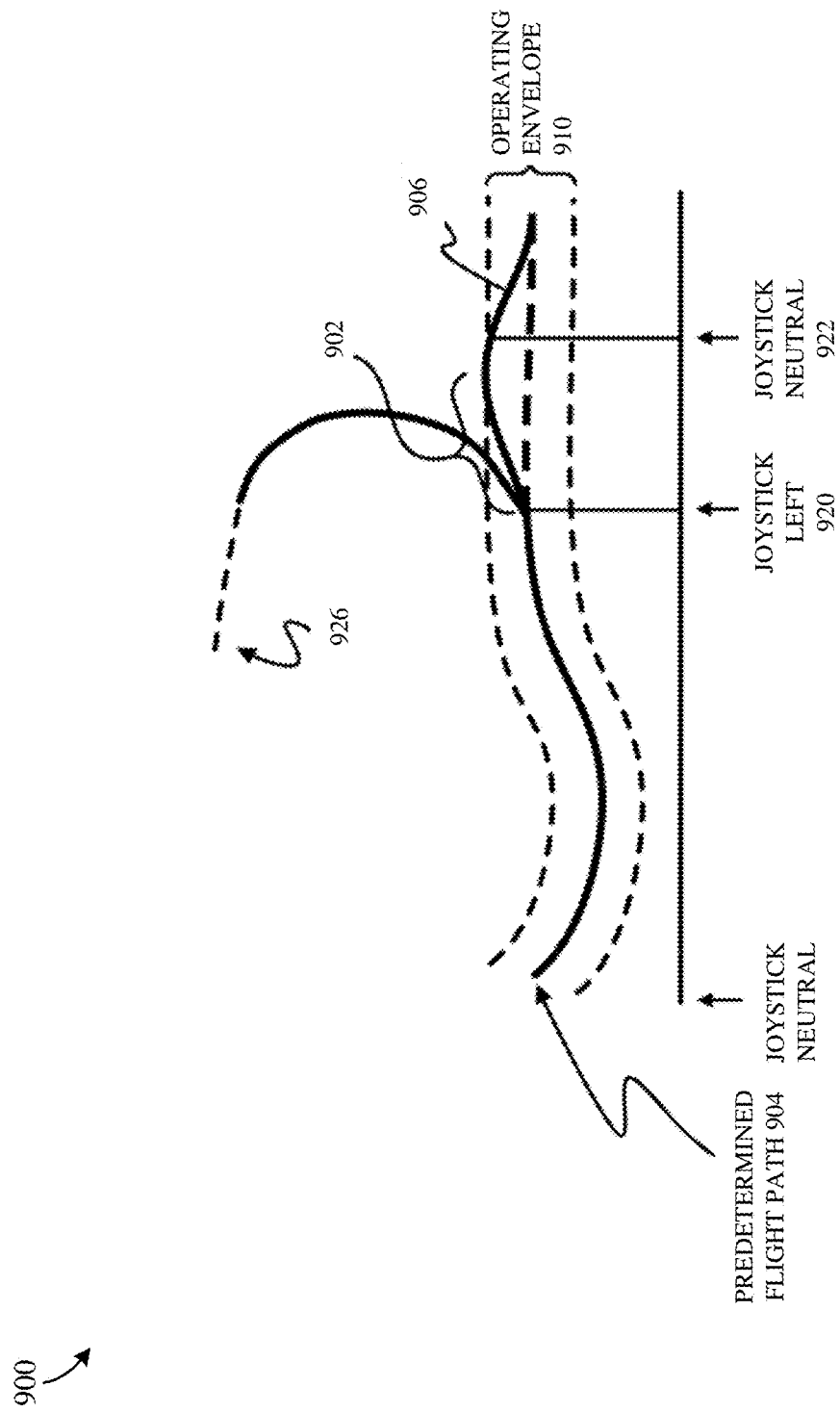
FIG. 9 illustrates an exemplary overhead view of effect of pilot commands on drone flight by autopilot along computed flight path.

FIG. 9 shows an overhead view 900 of a predetermined drone flight path of a drone flying by autopilot control. As a drone flies predetermined flight path 904, when the drone pilot pushes the joystick to the left (event 920), such an input would typically disengage the autopilot operation and result in the drone turning leftward, which, if the joystick is held in that position and then released at shortly after, would result in the drone flying backward (926), and eventually stopping and hovering. However, in an implementation of the present technology, the same joystick input is filtered through a dampening function which produces a modified joystick command. The modified joystick command causes the drone to make a slight leftward departure 902 from the flight path 902 but still following flight path 902. Thus, when the joystick returns to its neutral position (event 922), i.e. when the pilot ceases to push the joystick, the drone executes a return 906 to and resumption of its computed flight path 904 or programmed operation. The net effect of such an implementation of the technology is to create an operational envelope 910 around flight path 904 where the drone preferentially adheres to flight path 904 but can make deviations away from that path in terms of the drone's position or orientation based on joystick data provided by the drone pilot.

Figure 10:
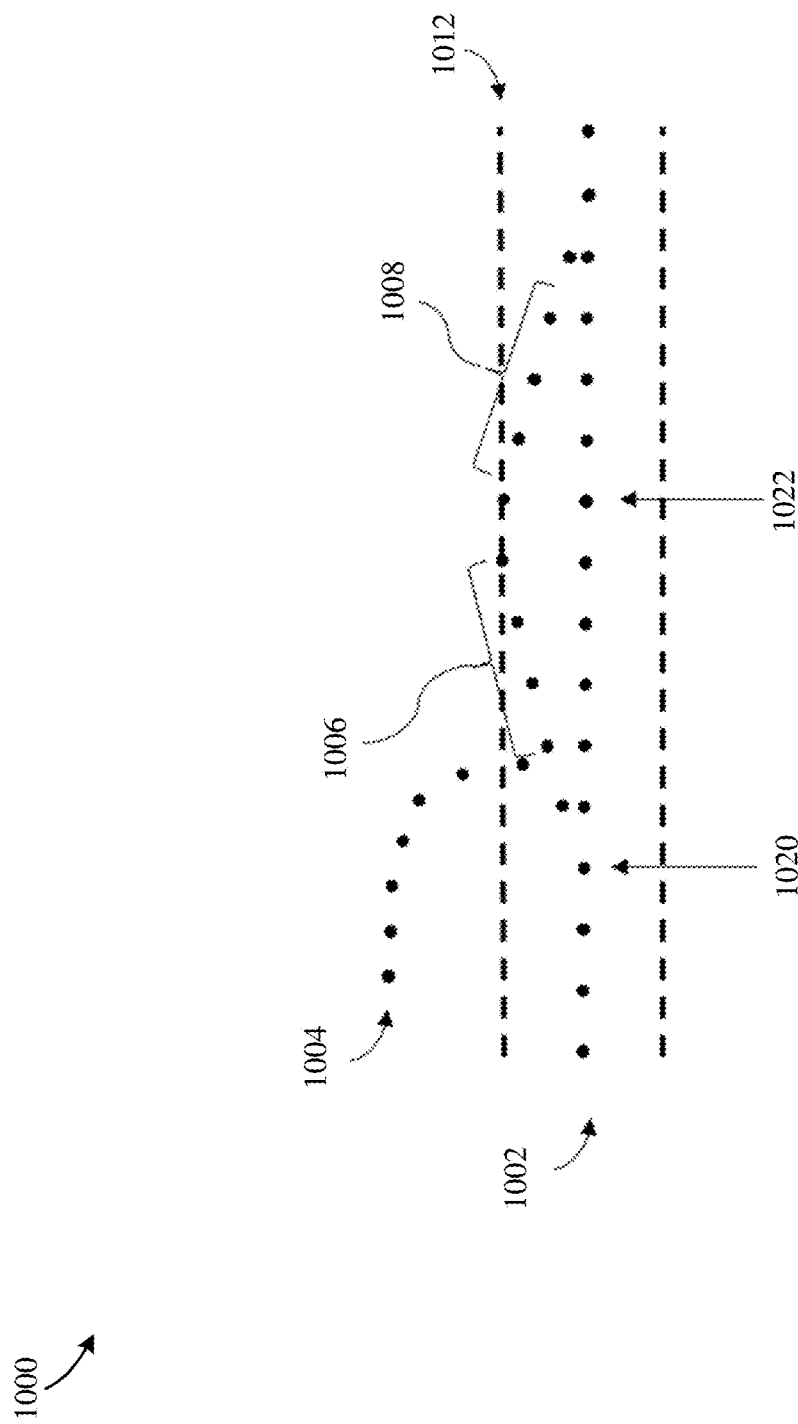
FIG. 10 illustrates an exemplary overhead view of the computation of new position points for a modification to a computed flight path during flight.

When a drone flies a predetermined flight path, the autopilot communicates modified joystick commands to the electromechanical subsystem which then throttles the rotors accordingly. These modified joystick commands are typically issued several times per second, such as every 50 milliseconds. Factored into the commands are the current position of the drone, the desired next position of the drone according to the flight path, and external or environmental factors such as wind speed and direction. In one aspect of the present technology, the autopilot factors into the modified joystick commands factors governing drone flight operations. These factors can affect drone operation such as by attenuating the drone's dynamic response to joystick data or by incorporating a collision avoidance response to object detection. In FIG. 10, points 1002 represent the position data computed incrementally by the autopilot of the flight control subsystem based on the computed spline. Points 1002 may also include flight parameters governing drone orientation, however, for the sake of clarity, this example is limited to a discussion of positional modifications. Overhead view 1000 of a drone flight path shown in FIG. 10 further exemplifies the effect of joystick data received from the remote-control device which causes a transient flight path deflection. The autopilot issues modified joystick commands at position 1020 which in turn creates a new path comprising a new set of flight parameters including incremental positional data 1006 and which may also include orientation data. Points 1006 represent a dampened response to the joystick input received from the remote control. When the pilot stops pushing the joystick at position 1022, the drone autopilot computes incremental positional data 1008 which returns the drone to flight path 1002. The dampening of the pilot's joystick commands effects an operating envelope 1012 about flight path 1002 which limits the ability of the drone to depart from the flight path even when the pilot pushes fully and continually on the joystick.

Figure 11:
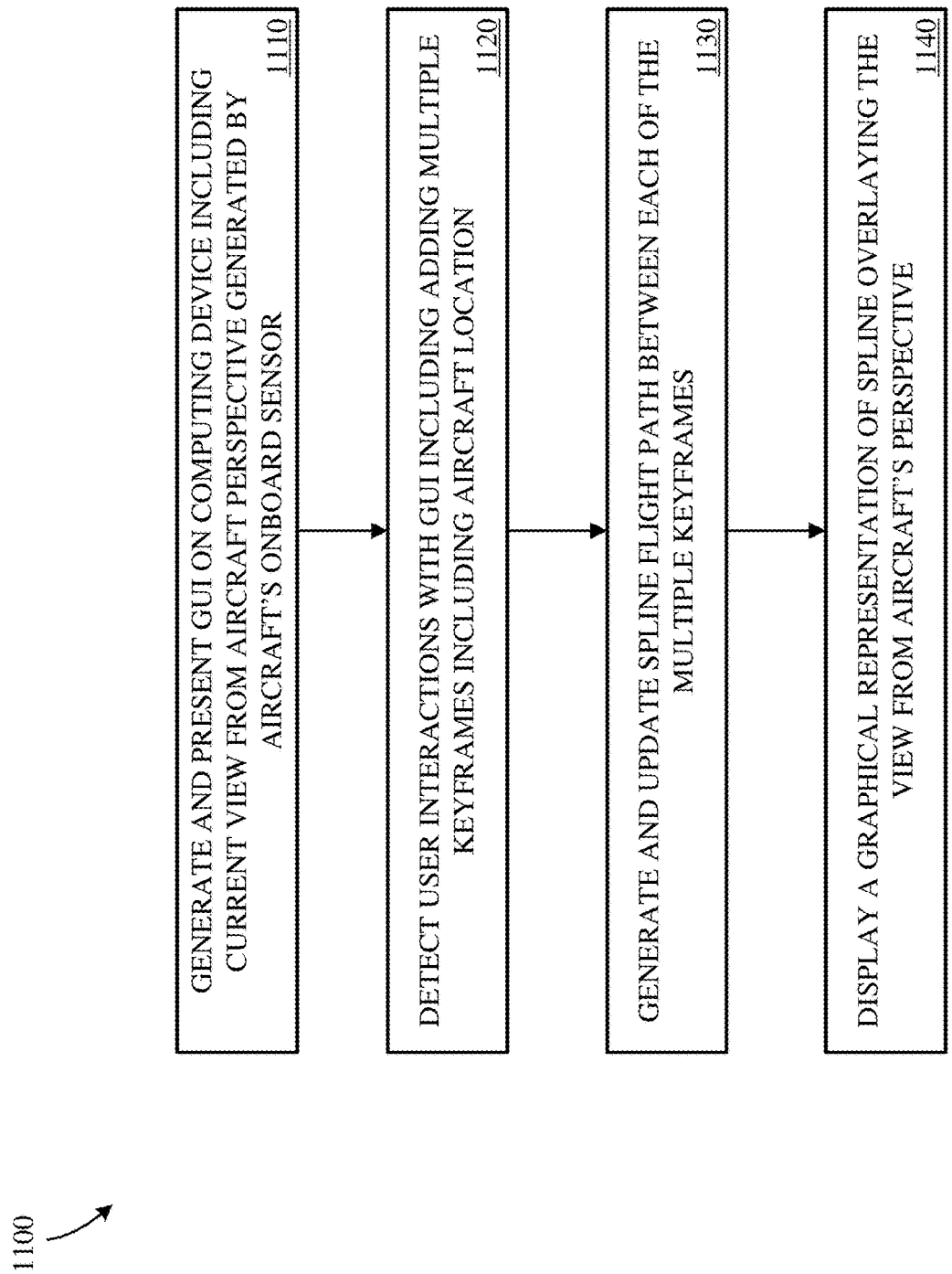
FIG. 11 illustrates a workflow for controlling an aircraft in an implementation.

FIG. 11 illustrates process 1100 implemented by one or more components of flight control subsystem 124 of UAV 101 and remote control 130. Process 1600 is implemented in program instructions that, when executed by the one or more hardware and/or firmware elements of flight control subsystem 124 and remote control 130, direct flight control subsystem 124 and remote control 130 to operate as follows. As UAV 101 is in flight controlled by remote control 130 operated by a pilot, a computer system directs the graphical user interface (GUI) on remote control 130 to display a perspective view from a sensor operatively coupled to flight control subsystem 124 (step 1110). The computer system detects inputs from the pilot interfacing with the GUI which include instructions to add keyframes, wherein the keyframes comprise the spatial location of UAV 101 and direction of the sensor (step 1120). The computer system continually generates and updates a spline comprising a projected flight path or trajectory between each of the multiple keyframes and including the direction of the sensor (step 1130). The computer system continually displays a graphical representation of the spline overlaid on the perspective view from the sensor onboard UAV 101 (step 1140). In an implementation, the sensor is a forward-facing camera providing a first-person perspective view of UAV 101. The direction of the camera corresponds to the gimbal angle of the camera relative to level flight.

FIGS. 12A-12J illustrate an implementation of a user interface presented to a pilot on the display screen of a remote control. In this example, the remote control displays the user interface of an augmented reality-based autonomous flight control application which receives inputs from a pilot and commands the drone to fly accordingly. The remote control displays the user interface on a touchscreen along with various input devices such as buttons, sliders, and so on in virtual form. In other implementations, the input devices may be physical buttons, sliders, toggles, joysticks, etc. on the remote control. The remote control may be a computing device such as a dedicated drone control device, a smartphone, tablet or other mobile device, or a laptop or other computer in wireless communication with the drone.

In this example, an autonomous flight control application receives inputs from a user or pilot through the virtual input devices of its user interface. Where the virtual input devices are described below as being "selected," this indicates that the autonomous flight control application has received an indication from the pilot (such as by touching, tapping, or "clicking" the virtual input device) causing the virtual input device to change its state. The application responds to that change of state according to its program instructions.

In this example, a drone operating in KeyFrame Mode generates a computed spline flight path or "spline" circling a small copse of trees and then flies the spline during playback. The UI software displays an AR representation of the computed spline and the associated keyframes overlaying a live video feed from an onboard camera on the touchscreen. The UI software continually updates the AR representation of the spline and the keyframes as the keyframes are added, edited, or deleted and the spline is generated or recomputed, and during playback as the drone flies the spline. The computed spline can be recorded and saved for later use by the same drone or by other drones with similar capabilities. The computed spline may also be edited in later uses; any changes may be saved as new splines or as revisions that may be selectively added to the spline in later use.

Figure 12A:
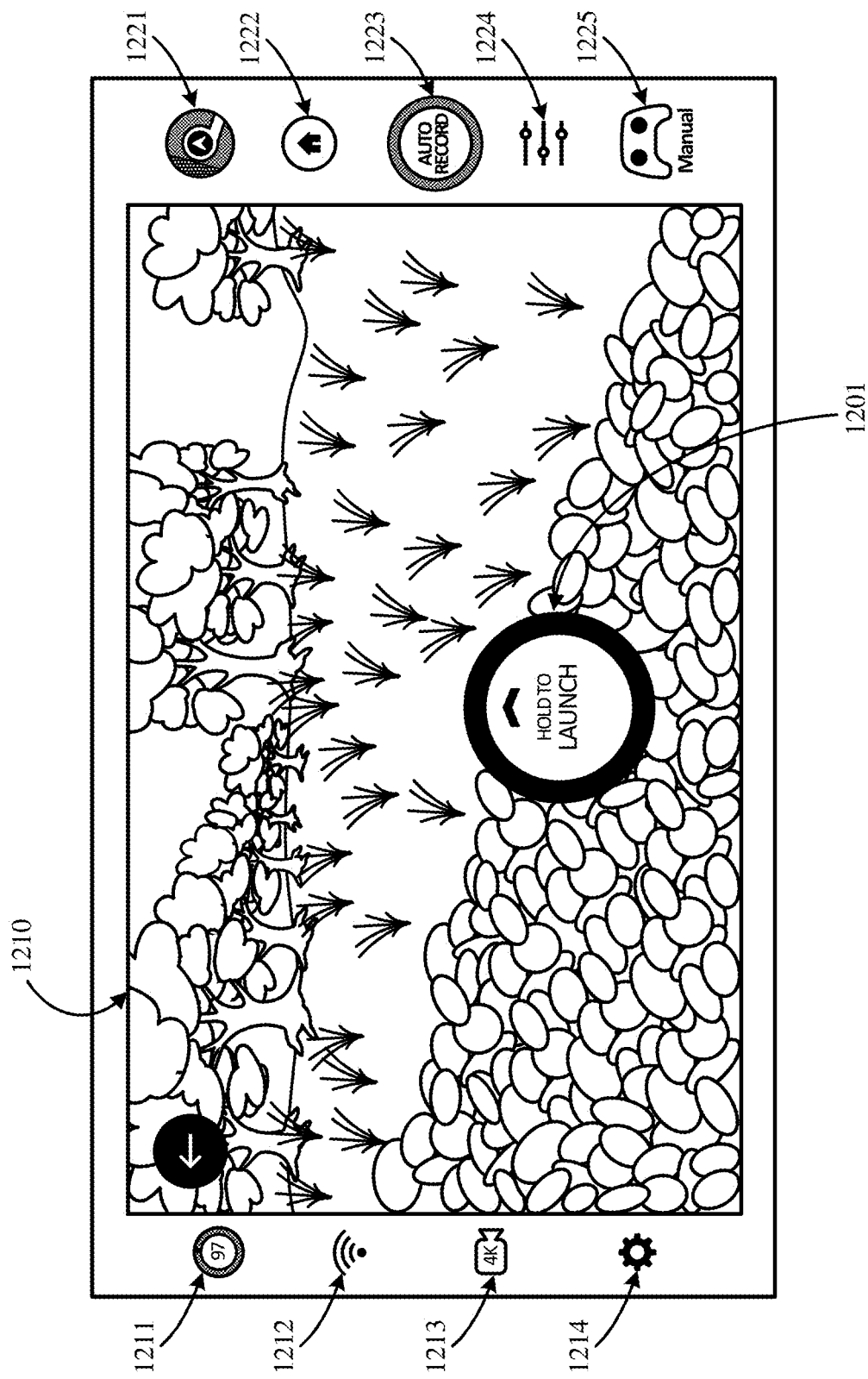
FIG. 12A-12J illustrate multiple views of the graphical user interface of an autonomous flight control application on a drone remote control in an implementation.

At the outset of this example, FIG. 12A illustrates an implementation of the UI of an AR-based autonomous flight control application on a touchscreen of a drone remote control when a spline is to be defined. The touchscreen displays camera view 1210 captured by an onboard camera. At the center of the touchscreen, the UI displays Launch button 1201 which causes the application to launch the drone from its dock. To the left of the screen are virtual indicators by which the UI presents various statuses relating to drone operation or virtual buttons by which the pilot can access aspects of drone operation: battery charge indicator 1211, Wifi signal strength indicator 1212, camera resolution indicator button 1213, and settings button 1214. To the right of the screen are: map button 1221 to access graphical map, home button 1222, Auto Record indicator 1223 which indicates whether video is being recorded, settings button 1224, and operating mode graphic 1225 which indicates the operating mode of the drone (in this view, the drone is being operated manually).

Figure 12B:
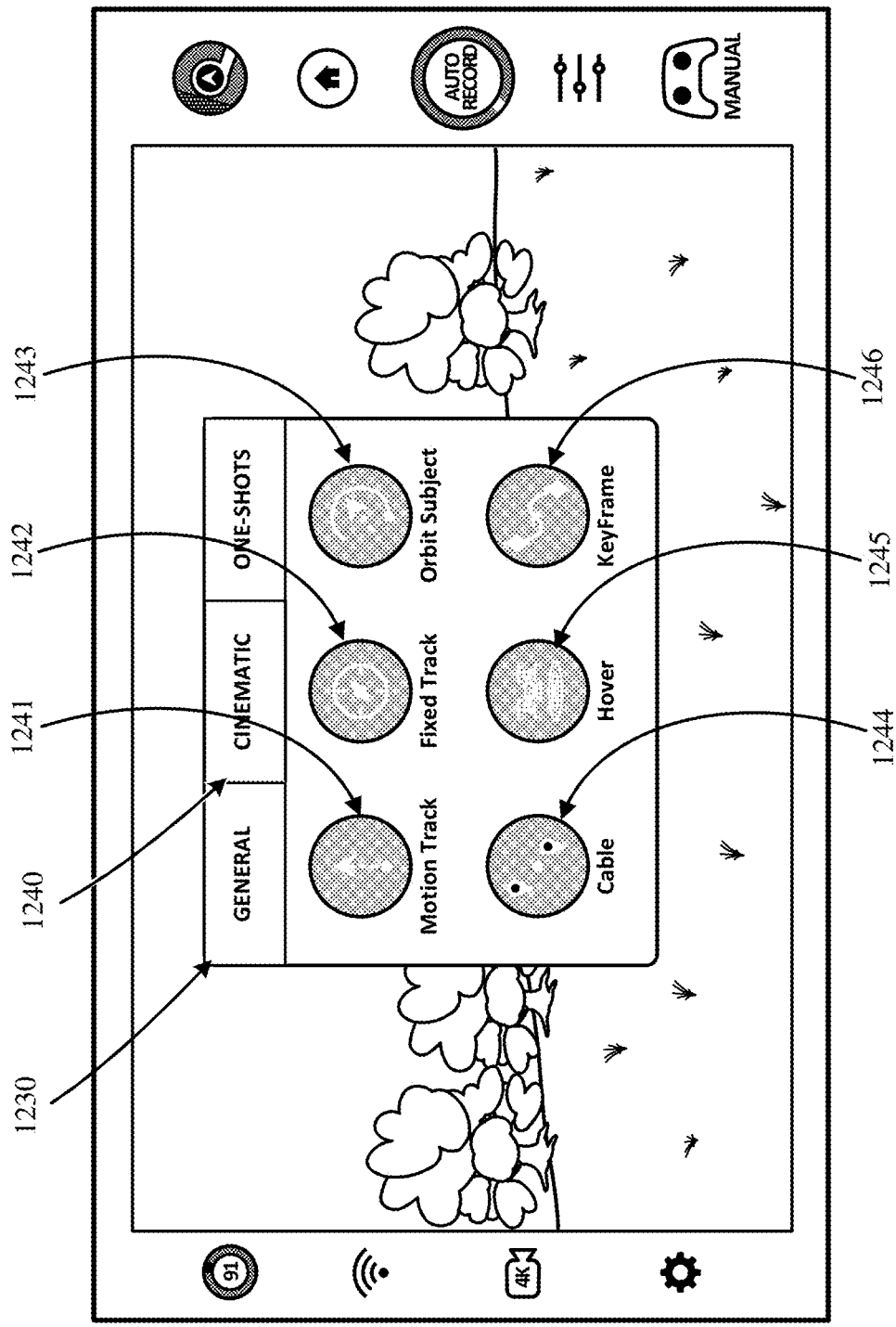

FIG. 12B illustrates the UI of an autonomous flight control application when home button 1222 is selected in an implementation. When the UI receives an input indicating that home button 1222 has been selected, the UI displays tabbed window 1230 including Cinematic tab 1240 for selecting from among several modes of automated drone flight. Motion Track button 1241 causes the drone to track an object such as an individual or vehicle in motion during flight while autonomously avoiding obstacles along the way. Fixed Track button 1242 initiates Fixed Track mode which is used to track a subject traveling on a fixed track. Fixed Track mode causes the drone to follow the subject while keeping a set distance from the subject and while maintaining its original camera orientation. Orbit Subject button 1243 initiates a subject tracking flight operation of the drone whereby the application commands the drone to fly an orbit around a subject. Cable button 1244 engages a method of operating the drone whereby the application defines two keyframes marking the endpoints of a flight path and then flies the drone between the two points as if tethered to a cable strung between them. Hover button 1245 causes the drone to hover at a single spatial location or keyframe. KeyFrame button 1246 activates a KeyFrame Mode of drone operation in which the application records and stores multiple keyframes, automatically and dynamically generates a spline flight path between each of the keyframes, and commands the drone to fly the spline. In KeyFrame Mode, the application may also incorporate inputs received by the UI from the pilot's interactions with input devices of the interface. In KeyFrame Mode, an existing spline can also be edited and saved for reuse by the drone or by other drones with KeyFrame Mode capability. The saved spline may be saved in and retrieved from nonvolatile storage onboard the drone, within the controller, on a computer in communication with the controller or the drone, or in connected cloud storage.

Figure 12C:
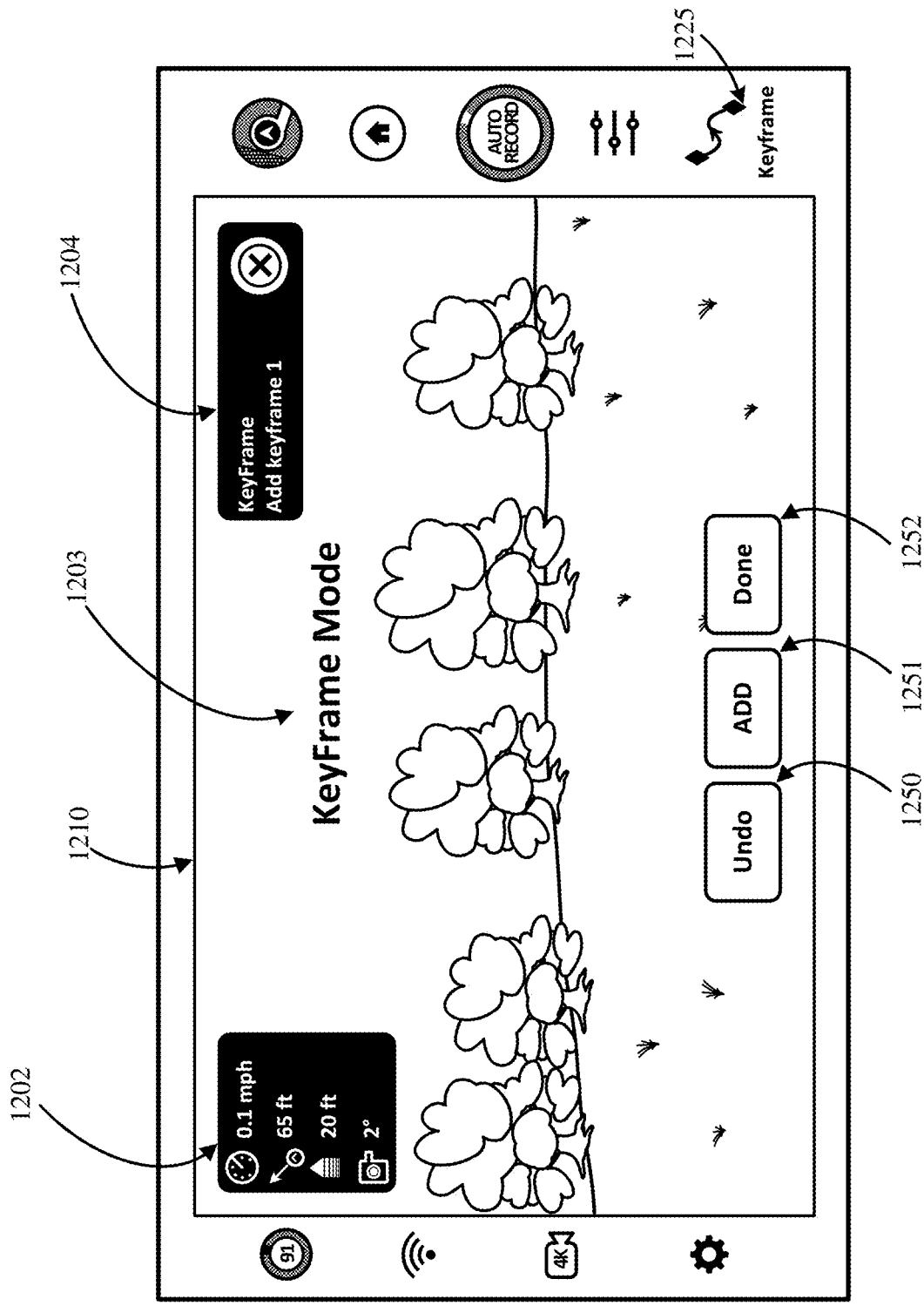

FIG. 12C illustrates the UI of an autonomous flight control application when KeyFrame button 1246 is selected causing the application to initiate the KeyFrame Mode of operating the drone as indicated by operating mode graphic 1225. In this mode, the touchscreen displays camera view 1210 from an onboard camera. The UI displays text display 1203 to indicate the current mode: "KeyFrame Mode." Flight parameter set 1202 is a graphic in the upper left corner of the touchscreen displaying drone flight speed, drone distance from the dock, drone elevation, and gimbal angle of the camera relative to level flight. At the bottom center of the touchscreen, the UI displays virtual buttons by which the pilot can define keyframes to be used in generating the spline: Add button 1251 causes the application to add a keyframe at the drone's current location, Undo button 1250 reverses the action triggered by Add button 1251 (i.e., undoes adding the most recently added keyframe), and Done button 1252 terminates the addition of keyframes. At the upper right corner of the touchscreen is graphic 1204 for pausing KeyFrame Mode so the pilot can stop autonomous flight and take manual control. Note that camera view 1210 is darkened to enhance the visibility of text display 1203.

Figure 12D:
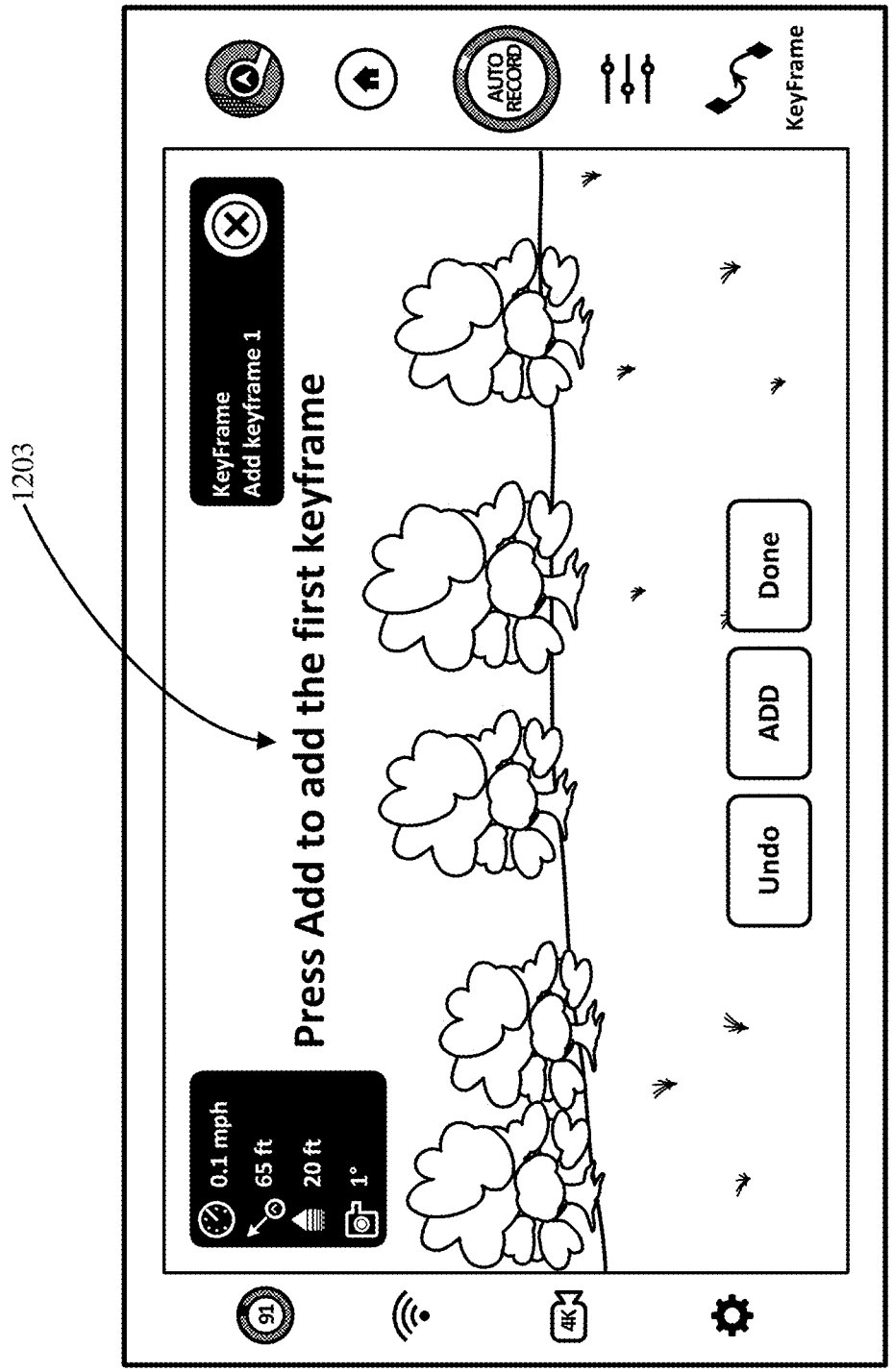
Figure 12E:
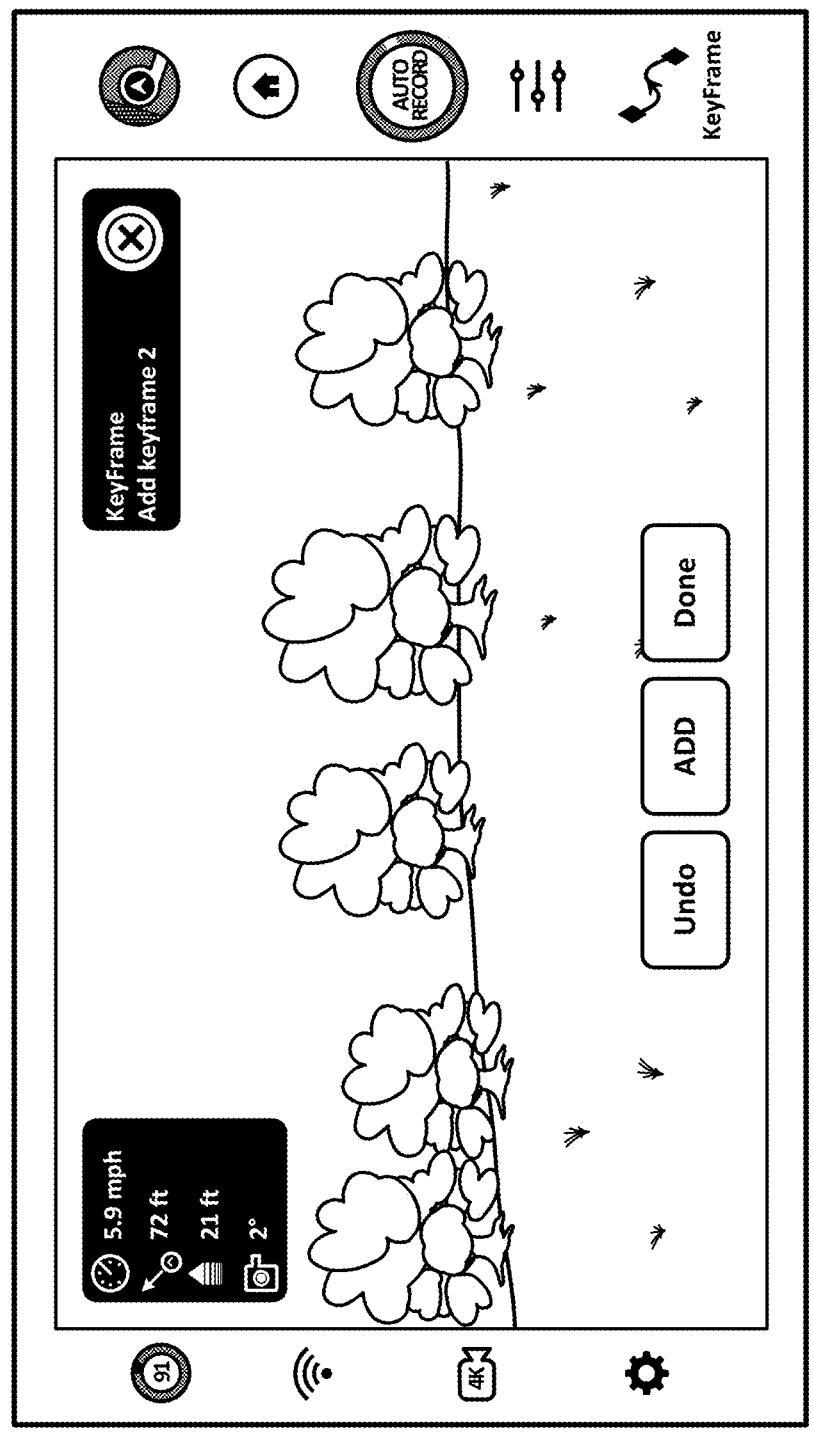
Figure 12F:
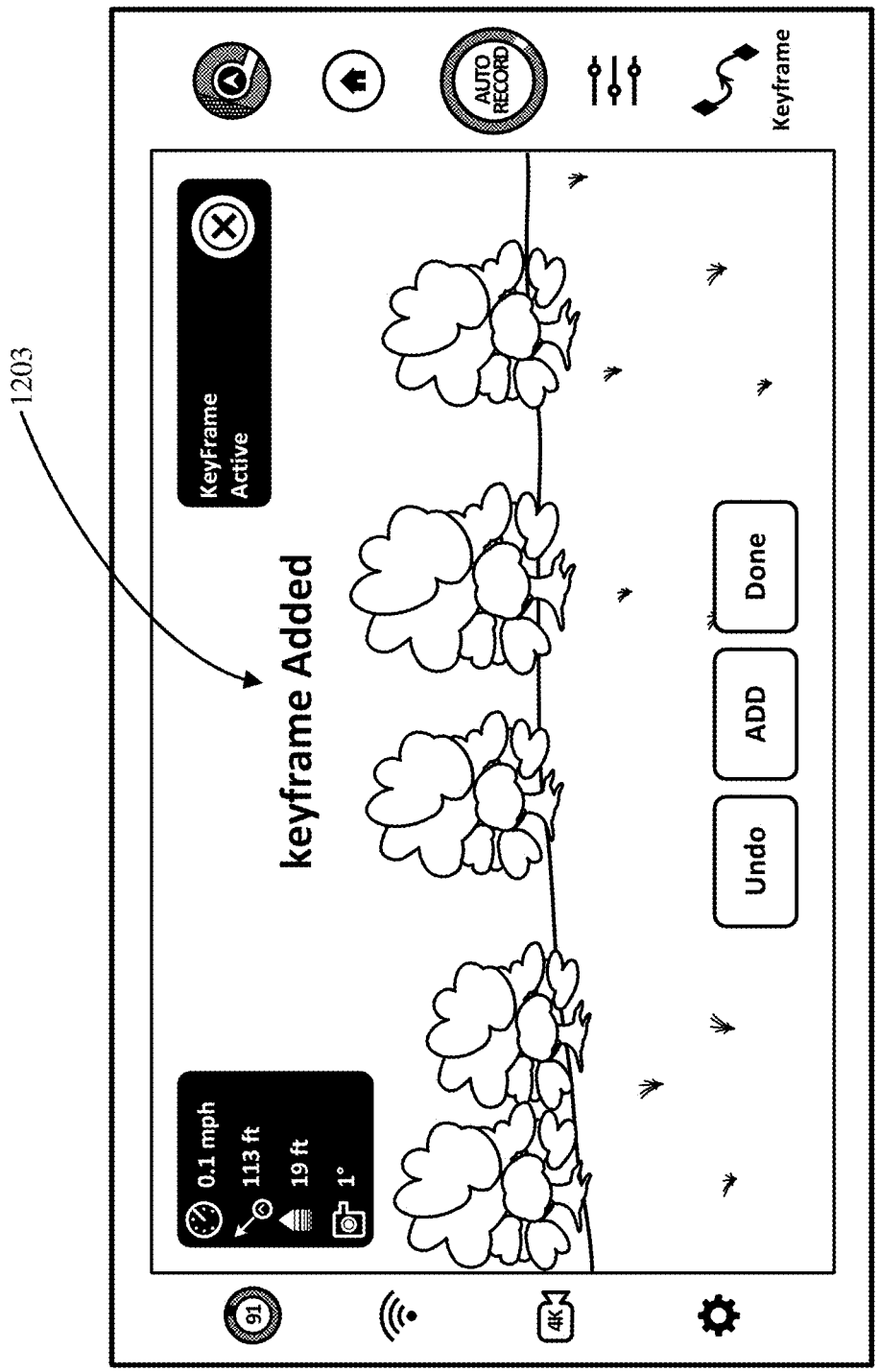

FIG. 12D illustrates the UI at the initiation of KeyFrame Mode with the UI of the autonomous flight control application prompting the pilot to add the first keyframe in text display 1203. FIG. 12E illustrates the UI after the first keyframe is added. When a keyframe is added, the autonomous flight control application records the spatial location of the drone. The application may also record the drone orientation, the gimbal angle of the onboard camera, focal length and/or exposure settings of the onboard camera, the velocity of the drone, and/or other flight or operational parameters at the newly added keyframe location. In FIG. 12F, the drone has been piloted to a position closer to the copse for the second keyframe, and a second keyframe is added. FIG. 12F illustrates text display 1203 of the UI confirming that a keyframe has been added.

Figure 12G:
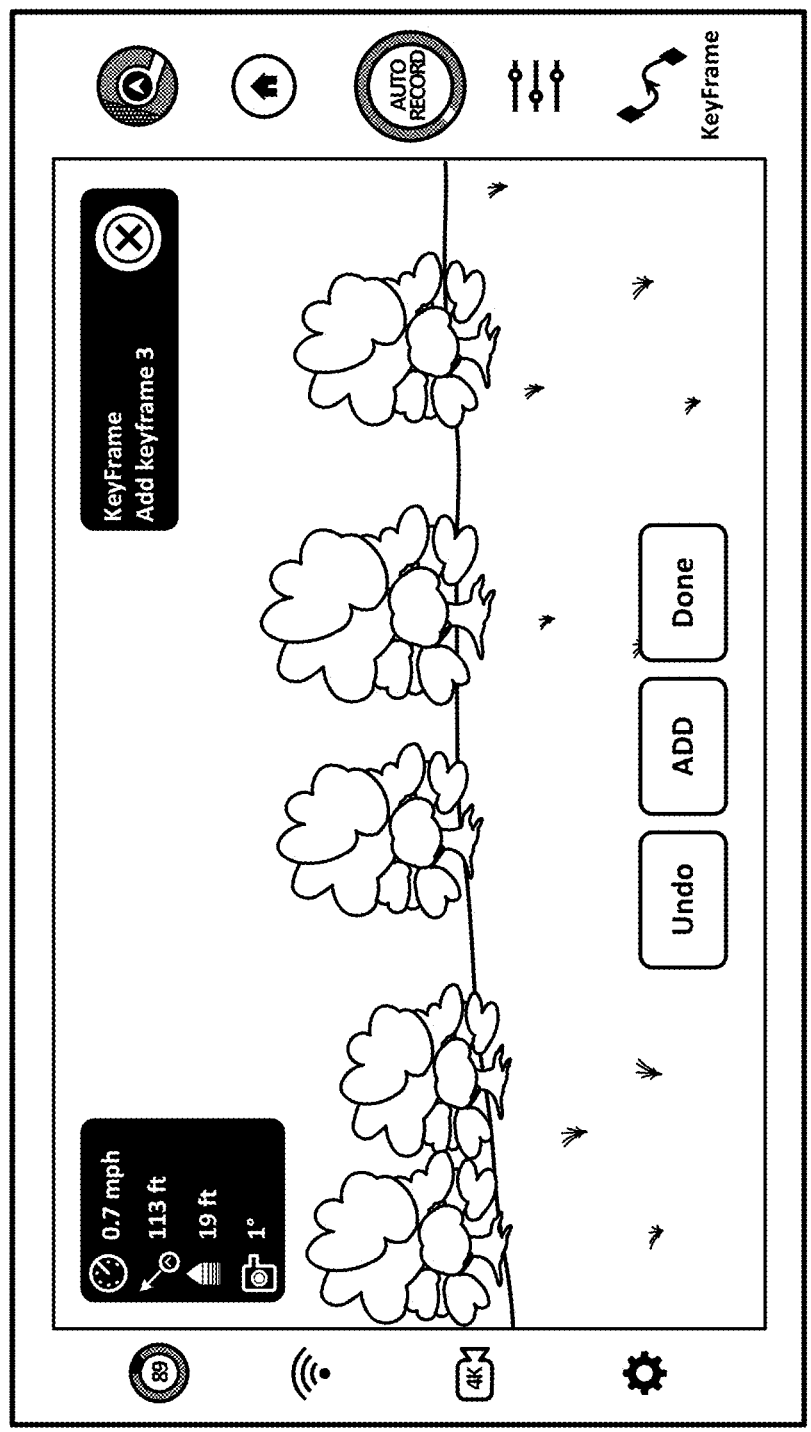
Figure 12H:
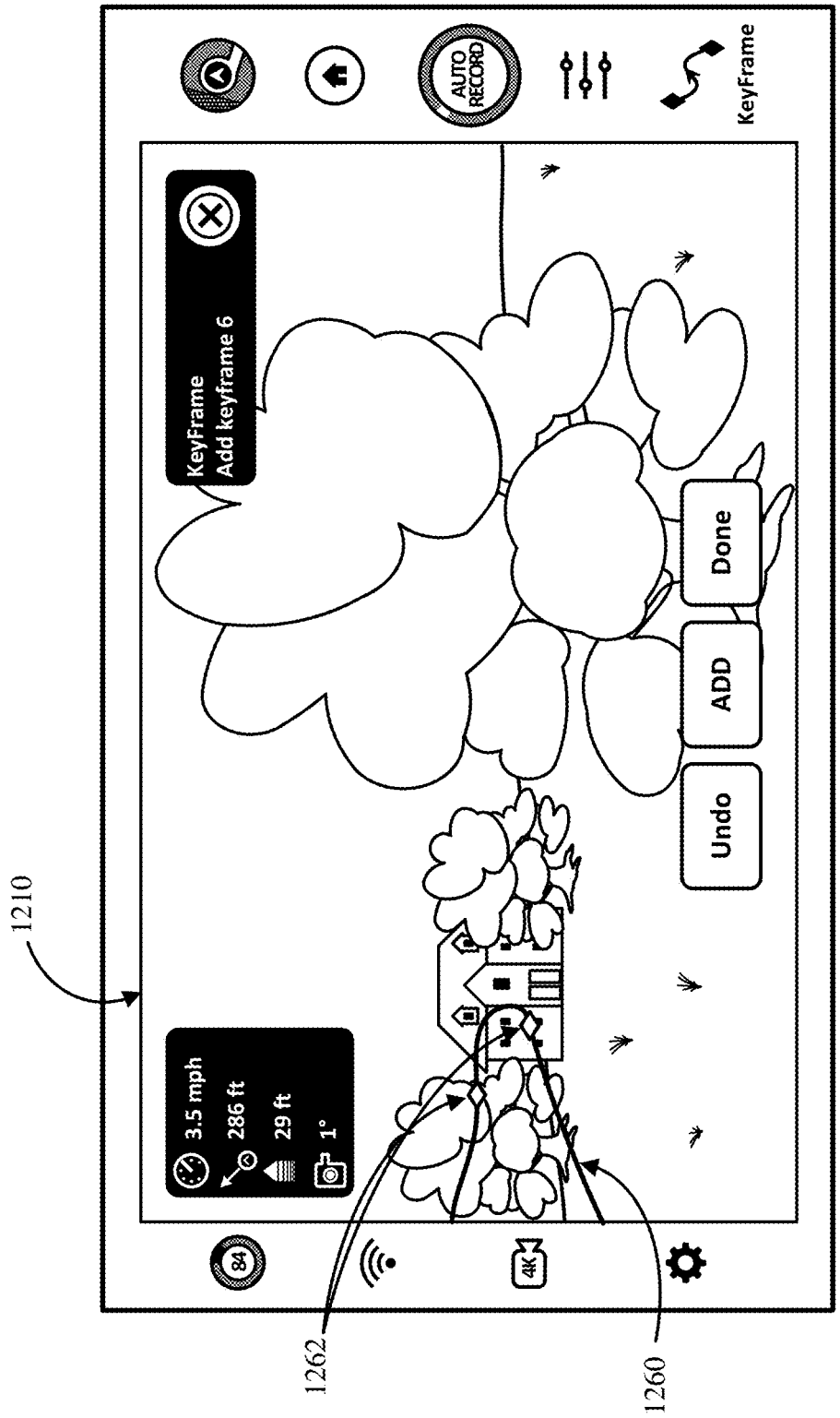

The example continues with the process of adding keyframes. FIGS. 12G and 12H illustrate the touchscreen display as the drone is piloted around the copse and keyframes are added. In KeyFrame Mode, the autonomous flight control application dynamically recomputes the spline as keyframes are added, and the AR representation of the spline is continually updated by the UI on the display. As illustrated in FIG. 12H, as the keyframes are added, computed spline 1260 is displayed on the touchscreen augmented over camera view 1210. Keyframe markers 1262 are displayed as diamonds on computed spline 1260.

Figure 12I:
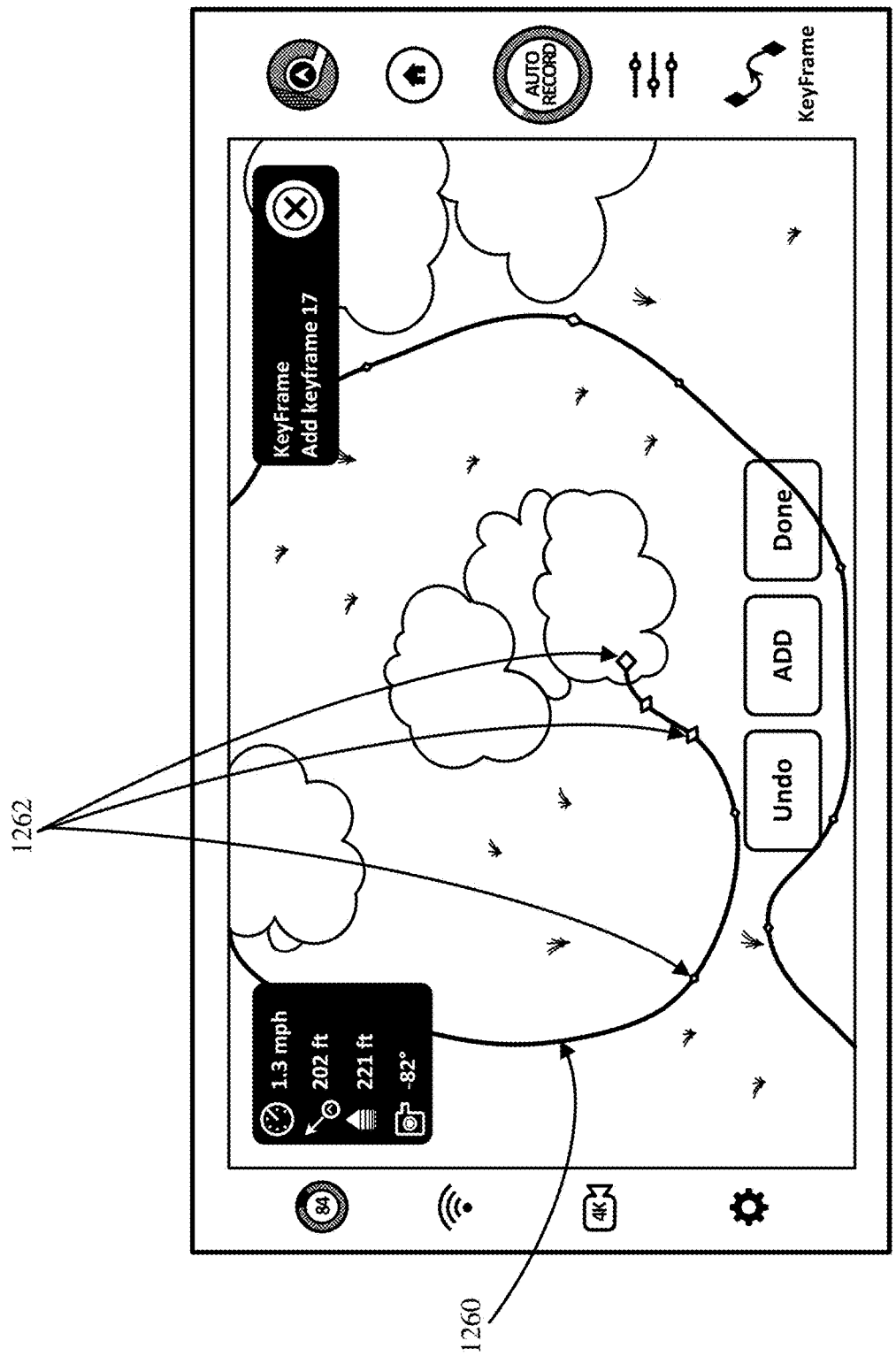

After several more keyframes have been added, FIG. 12I illustrates camera view 1210 looking down on the copse as the seventeenth keyframe is to be added. Computed spline 1260 and keyframe markers 1262 are more clearly seen in this view. Computed spline 1260 is a two-dimensional projection of the three-dimensional spline comprising a flight path or trajectory between each of the multiple keyframes. The size of diamond-shaped keyframe markers 1262 marking the locations of the keyframe varies with the order in which they are added, with the most recently added keyframe indicated by the largest diamond. Computed spline 1260 and keyframe markers 1262 may also be scaled in proportion to their distance from the drone, with the keyframe markers dynamically growing in size on the display as the drone approaches the keyframe location. In addition, different geometric shapes may be used to indicate keyframes according to a particular purpose, such as the starting point or end point of a computed spline.

Figure 12J:
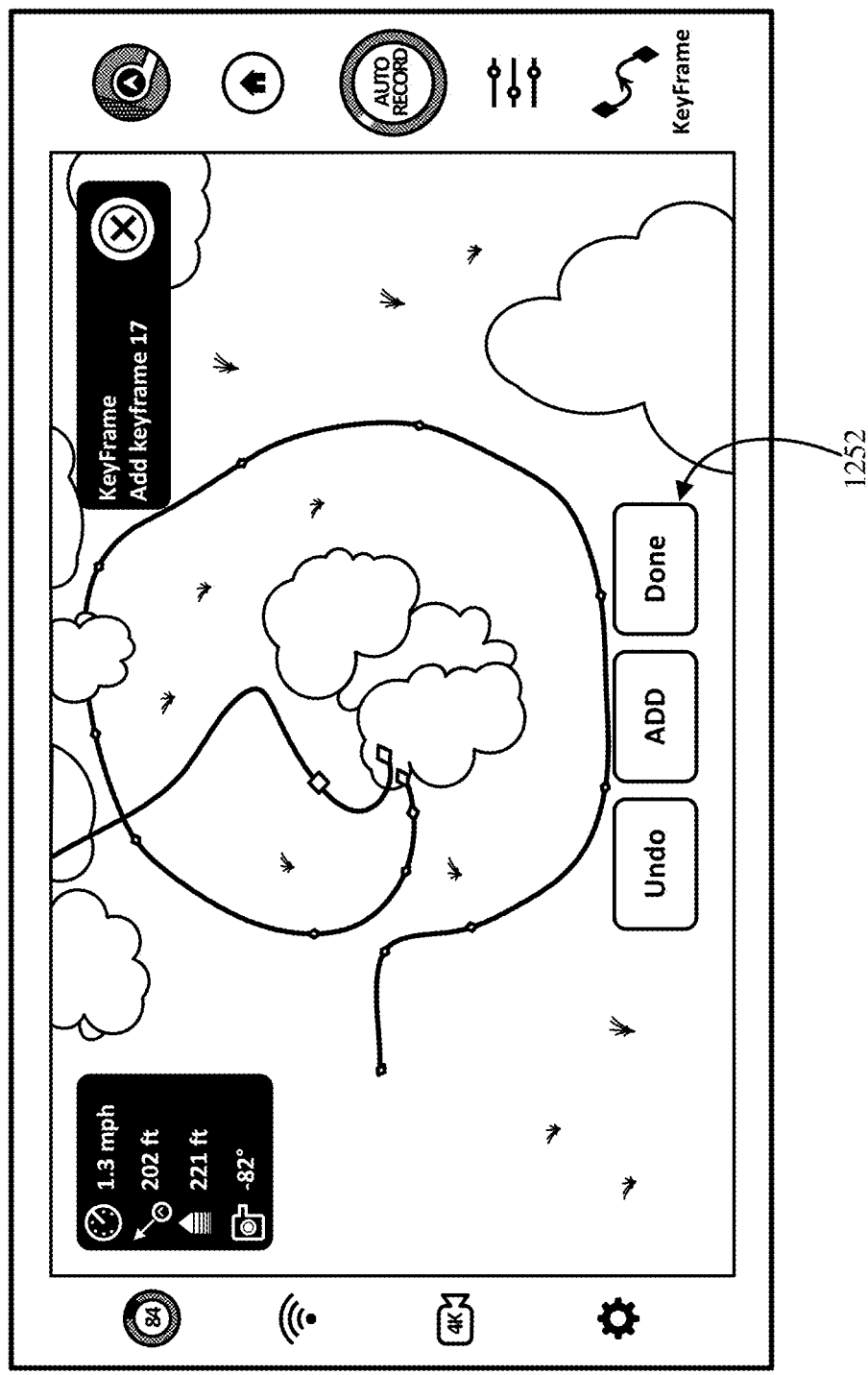
Figure 13A:
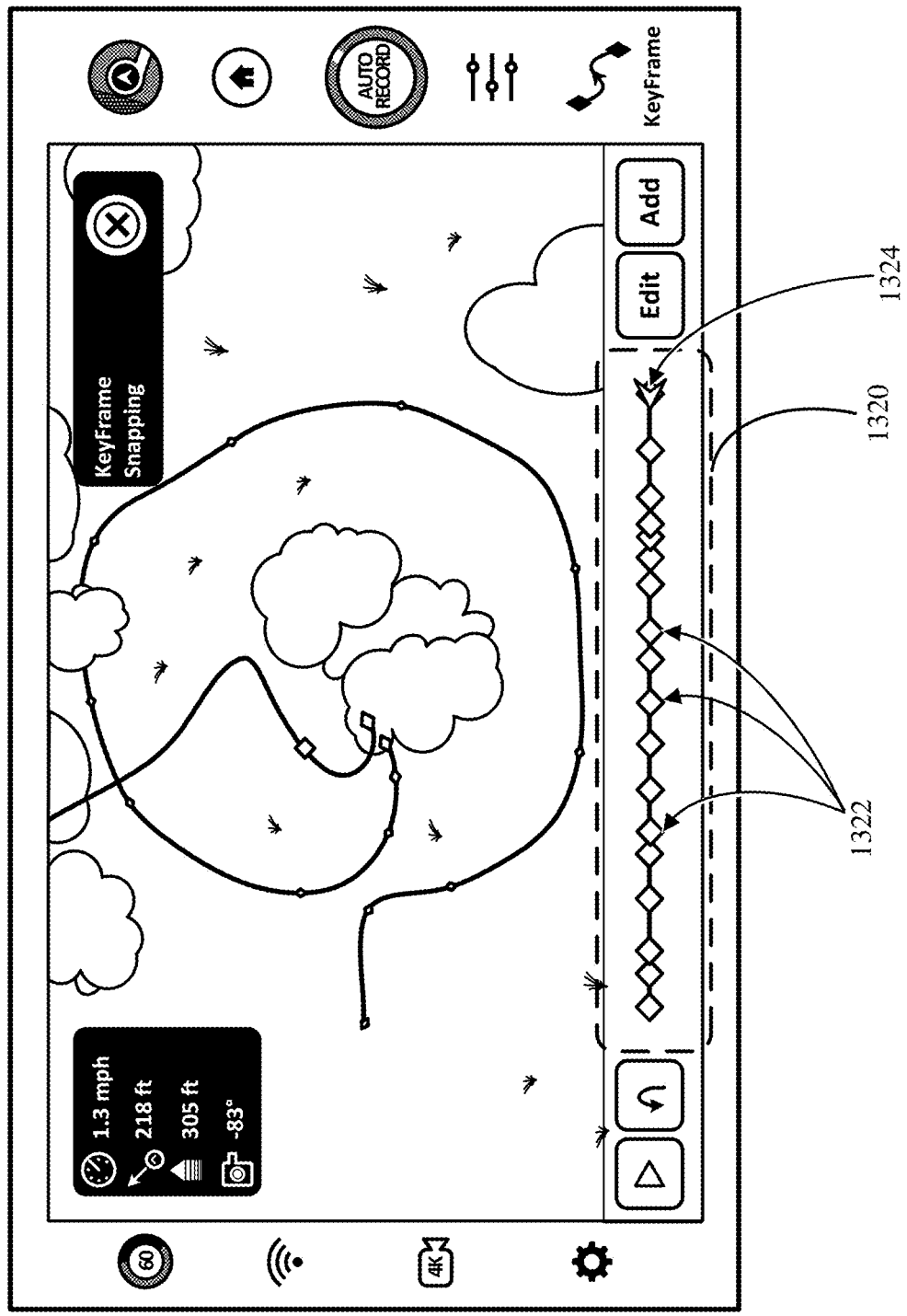
FIG. 13A-13D illustrates the user interface of an autonomous flight control application on a drone remote control in KeyFrame Mode in an implementation.

FIG. 12J illustrates the UI during keyframe addition and spline generation at the point when the pilot has completed adding keyframes. When the pilot selects Done button 1252, the autonomous flight control application receives an indication that the spline is complete and switches to a keyframe playback mode as shown in FIG. 13A.

Figure 13B:
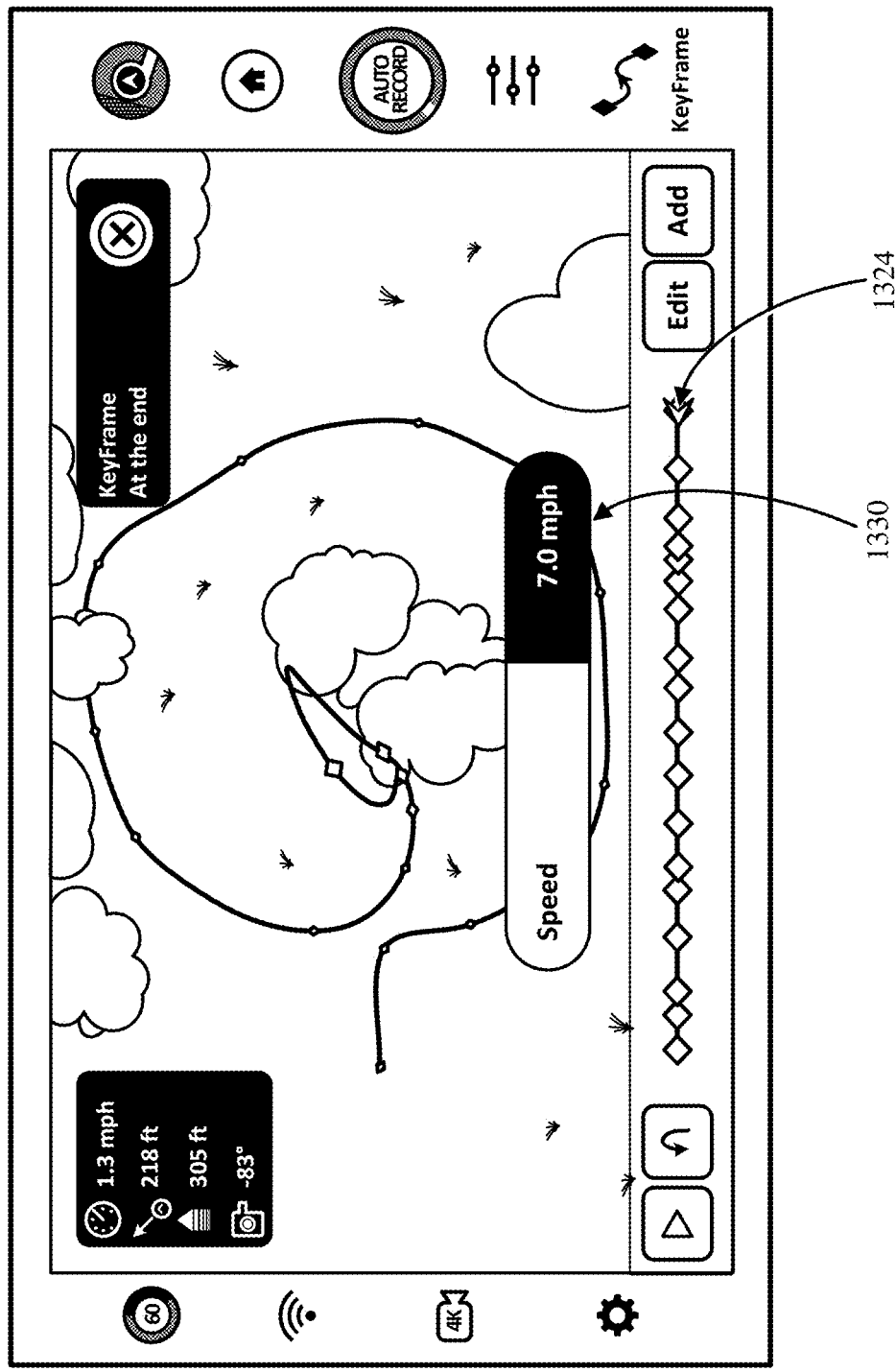

FIGS. 13A-13D illustrates an implementation of a UI once a spline definition is complete and the spline is to be played back. At the bottom portion of the touchscreen display shown in FIG. 13A, the UI of the autonomous flight control application displays playback track 1320, which is linear graphical representation of the computed spline. On playback track 1320, keyframes are represented as diamonds 1322, and the current position of the drone along the spline is also shown as arrowhead 1324. The relative distance between the keyframes is indicated by the proportional spacing of diamonds 1322 on playback track 1320. FIG. 13B illustrates the addition of virtual speed control slider 1330 to the touchscreen display by which the UI receives manual input(s) causing the application to speed up, slow down, or hover the drone as it traverses computed spline 1260. Using speed control slider 1330, the pilot can control drone speed between keyframes or across the entire spline. Note that in this illustration, arrowhead 1324 changes color to indicate when the drone is in motion. In an implementation, the relative time to travel between keyframes is indicated by the proportional spacing of diamonds 1322 on playback track 1320.

An additional functionality of playback track 1320 of the UI is to cause the drone to "snap to" any location on computed spline 1260. Tapping anywhere on playback track 1320 directs the application to fly the drone directly to that location without traversing the spline.

Figure 13C:
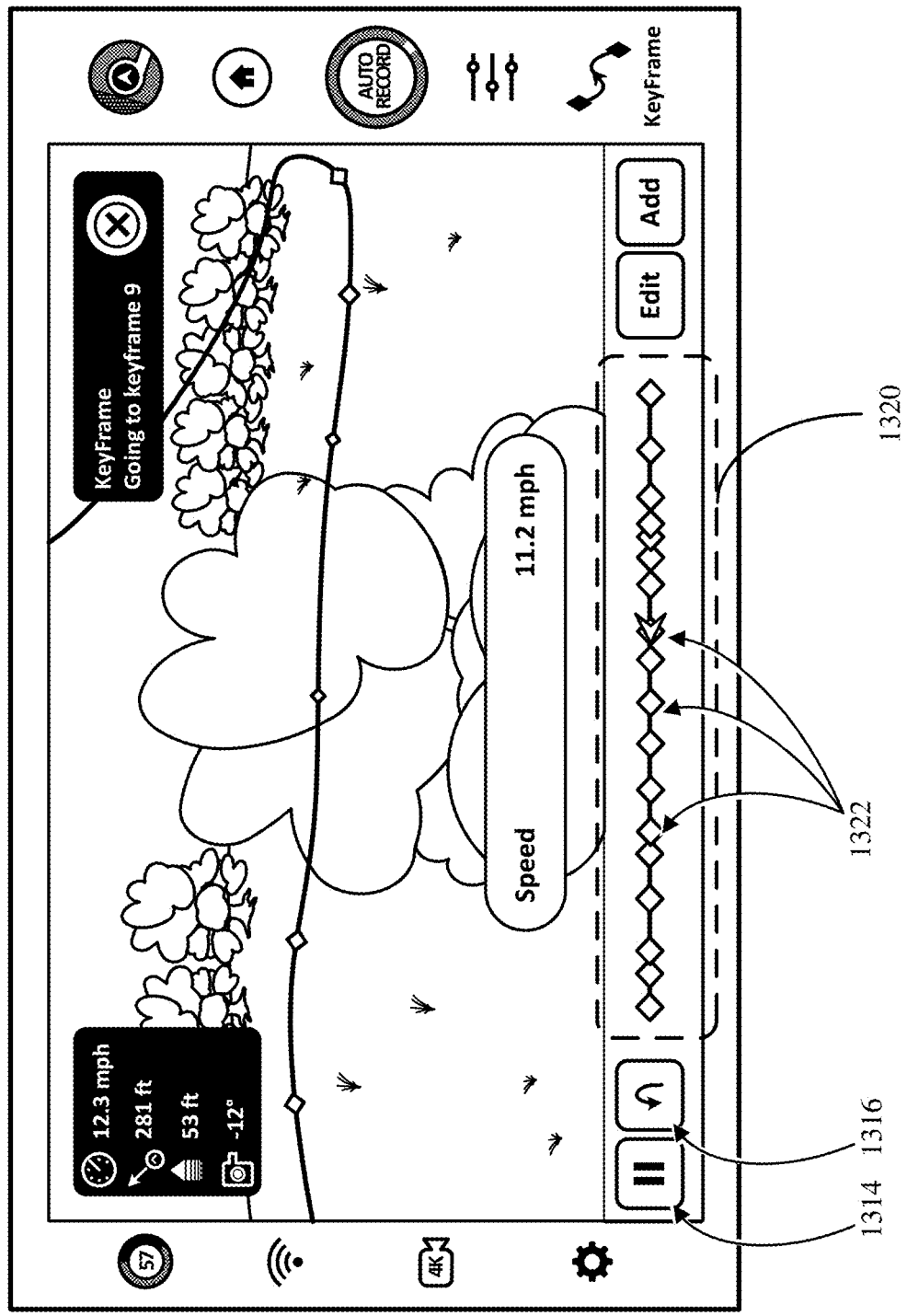

FIG. 13C illustrates an implementation of the UI in which the autonomous flight control application displays the progress of the drone as it flies spline 1260 during playback in KeyFrame Mode. The application may receive commands from the pilot using virtual play/pause button 1314 and forward/reverse button 1316 to fly the drone forward or backward along the spline or to pause and hover. The UI continually updates playback track 1320 to show both the direction of playback and current position of the drone along the spline. Diamonds 1322 change color to indicate the progress of the drone through the keyframes.

Figure 13D:
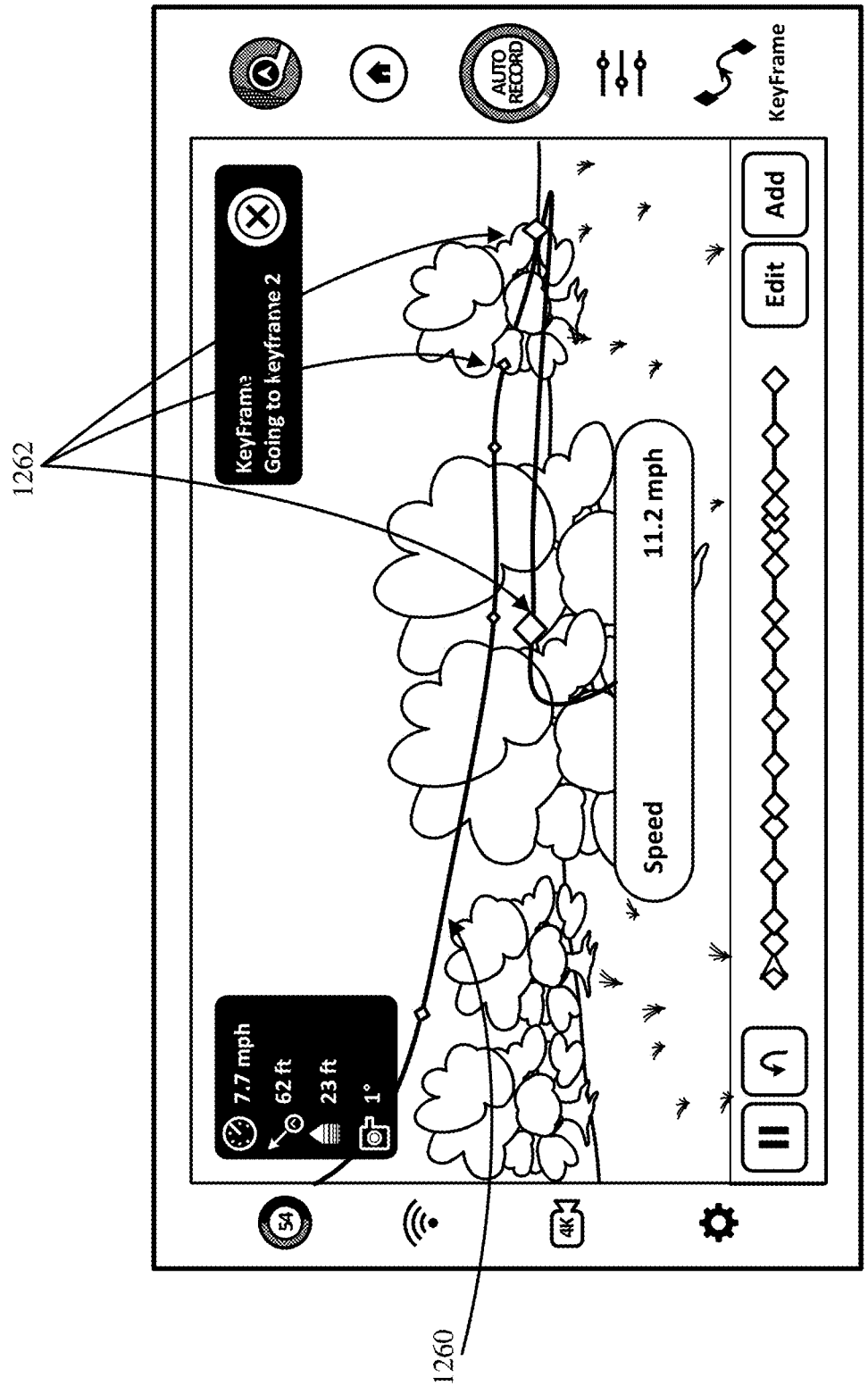

FIG. 13D illustrates the touchscreen display of a controller during playback in an implementation as the drone begins to travel computed spline 1260 starting at the first keyframe recorded in FIG. 12D. In this view, the UI of the autonomous flight control application displays a number of flight and operational commands which cause the application to: adjust the speed of the drone's travel along the spline; stop or reverse the drone along the spline; jump or "snap" to a keyframe out of order on the spline; add new keyframes, delete keyframes; or edit speed or orientation settings at any keyframe. Note that on the AR representation of computed spline 1260, the size of each of keyframe markers 1262 grows larger as the drone approaches the keyframe location. The UI displays computed spline 1260 in a color which is highly visible from the background (first-person) view on the touchscreen. This color can be programmatically chosen using an algorithm which detects the range of colors of camera view 1210, or the color may be set manually the pilot.

FIGS. 14A-14D illustrate an implementation of the user interface of an autonomous flight control system displayed on a smartphone touchscreen. In this exemplary implementation, the autonomous flight control application operating in KeyFrame Mode has generated a spline between each of the multiple keyframes. The application can edit a spline during playback by adding additional keyframes or by editing existing keyframes.

Figure 14A:
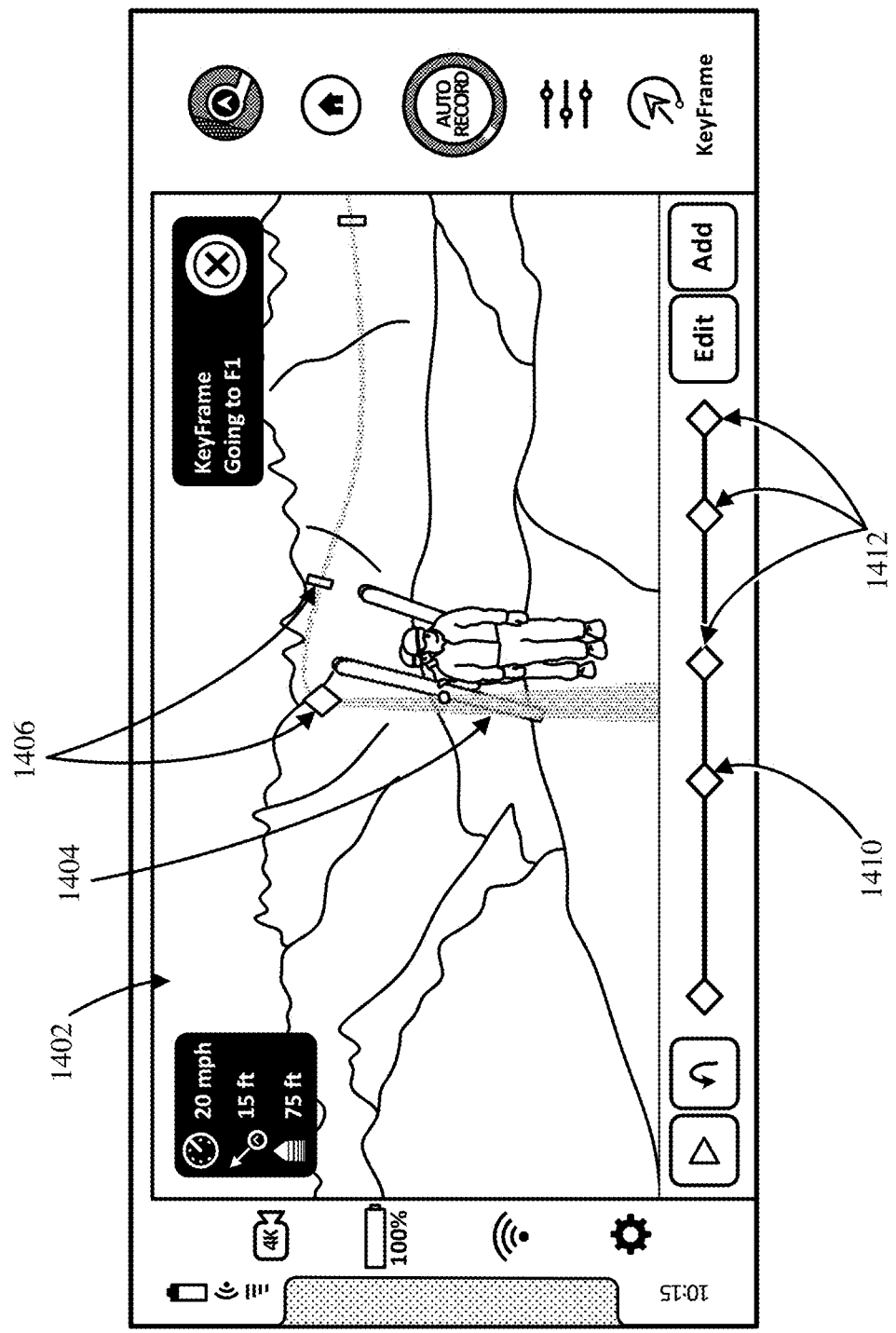
FIG. 14A-14D illustrates the graphical user interface of an autonomous flight control application in an implementation.

FIG. 14A illustrates the UI prior to the start of the drone's travel on the spline. The UI displays playback track 1410 with diamonds 1412 marking the locations of keyframes in proportion to their distances along the spline or in proportion to the time to travel between the keyframes. On the display, spline 1404 is AR graphic displayed over camera view 1402 with keyframe markers 1406 indicating the locations of upcoming keyframes as the drone traverses spline 1404.

Figure 14B:
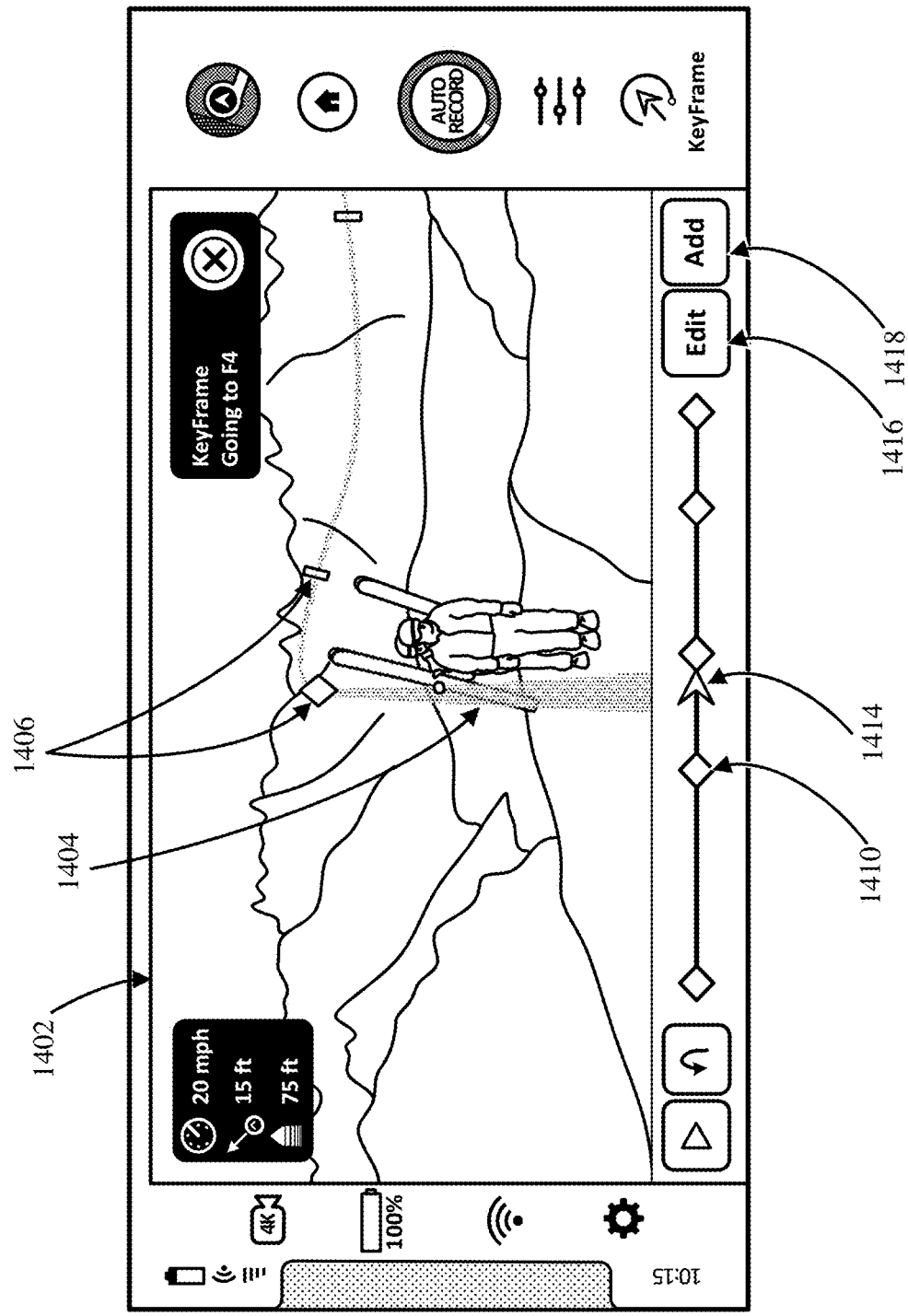

FIG. 14B illustrates the UI as the drone travels computed spline 1404 passing between the second and third keyframes. Arrow 1414 traverses playback track 1410 indicating in real time the location of the drone on spline 1404. Next to playback track 1410 are virtual input devices Edit button 1416 and Add button 1418. As the drone traverses spline 1404, when it reaches a keyframe, Edit button 1416 becomes active which allows the pilot to select the keyframe for editing. As the drone travels anywhere along spline 1404, Add button 1418 is active which, when selected, prompts the application to define and add a new keyframe at the drone's location, recording and storing the drone's location as determined by visual tracking or by navigational coordinates. The application may also record and store other flight or operational parameters for the new keyframe such as the gimbal angle, exposure settings, or focal length of the onboard camera.

Figure 14C:
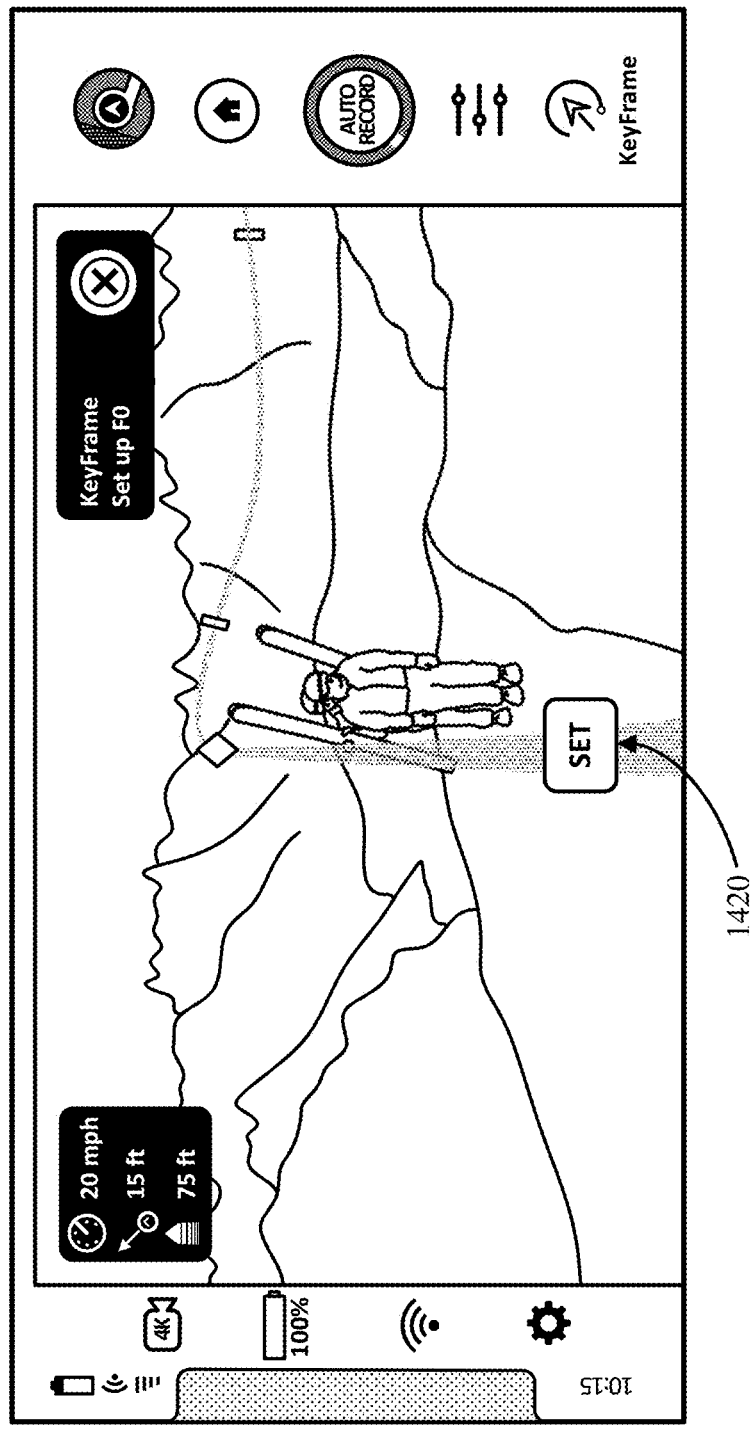

FIG. 14C illustrates the UI when Add button 1418 is selected. The UI prompts the pilot to set the location of the new keyframe by tapping Set button 1420. When Set button 1420 is tapped, the application recomputes spline 1404, directs the UI to display an updated graphical representation of spline 1404, and marks the location of the new keyframe by added a diamond to playback track 1410.

Figure 14D:
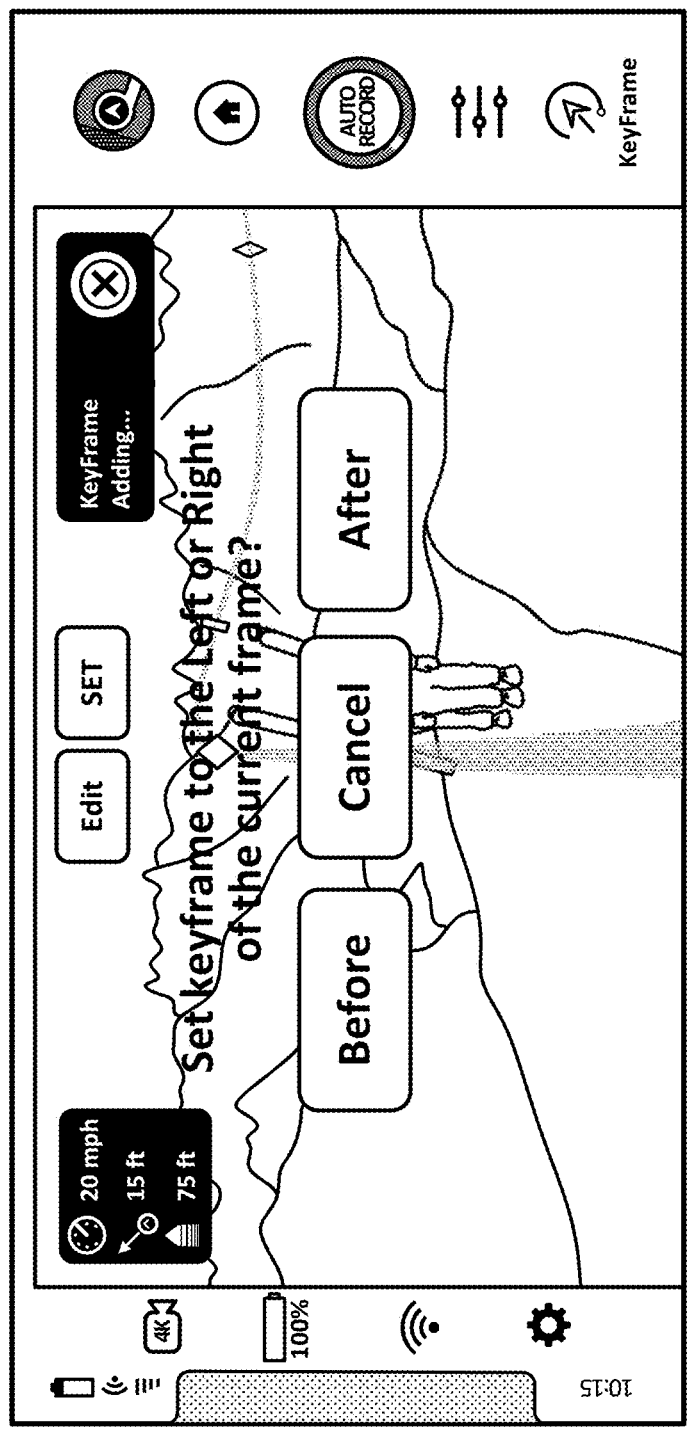

FIG. 14D illustrates the UI when the pilot taps Add button 1418 while the drone is at an existing keyframe: the application prompts the pilot to indicate whether the new keyframe should be positioned before or after the existing keyframe (or cancel the addition). When the pilot selects Before or After, the application recomputes spline 1404 and the UI updates the display accordingly.

Figure 15:
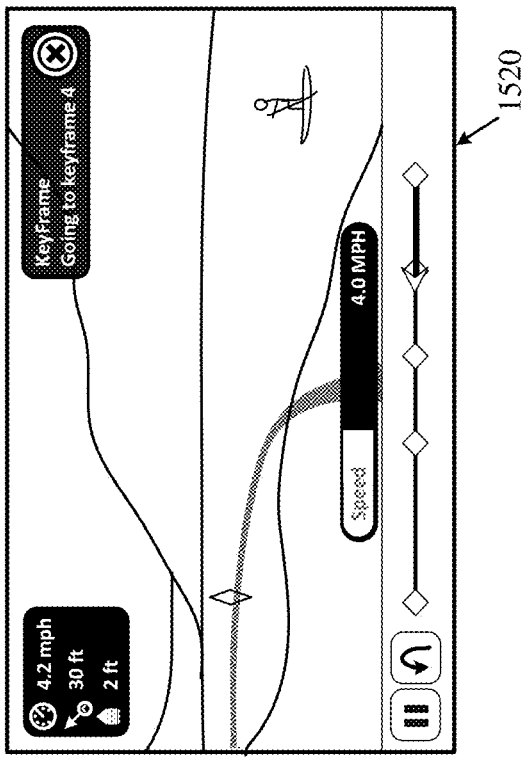
FIG. 15 is a sequence of images illustrating the user interface of an autonomous flight control application in an implementation during playback.
Figure 15:
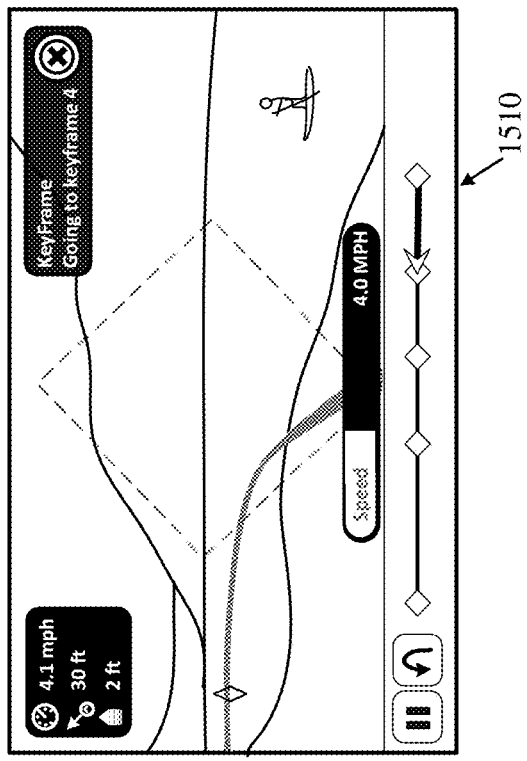
Figure 15:
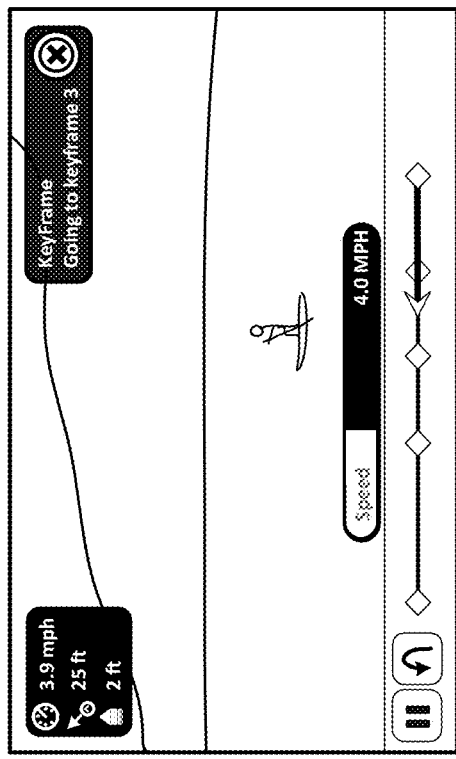

FIG. 15 comprises a sequence of images illustrating yet another implementation of the UI of an autonomous flight control application of drone operating in KeyFrame Mode during playback. Images 1510-1530 illustrate the display on a drone remote control. In image 1510, the display shows a first-person camera view is a live-feed from an onboard camera. At the bottom of image 1510, the drone arrow indicator is traversing the playback track traveling from right to left and shows the drone just as it approaches keyframe 4. As the drone approaches keyframe 4, on the AR overlay of the computed spline, a translucent diamond marking keyframe 4's location dynamically grows in size as the drone approaches it, then disappears (in image 1520) to simulate the drone passing through the AR keyframe diamond. Next, image 1530 shows the first-person view of the drone as it continues on the computed spline but with the drone pivoting starboard to track the paddleboarder. Having pivoted away from a forward-facing orientation, the AR representation of the computed spline is no longer visible, ostensibly because it is out of camera view to the left of the screen.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

In various implementations, the systems, methods, processes, and operational scenarios may be implemented in computer software executed by a processing system in the context of an unmanned aerial vehicle, a remote-control device, or any other type of device capable of executing software such as computers and mobile phones. The processing system may load and execute the software from a storage system or may be pre-configured with the software. The software includes and implements a process for creating a computed spline, which is representative of the spline-creation processes discussed with respect to the preceding Figures, such as process 200 and process 700. The software also includes and implements processes associated with the user interface of an autonomous flight control program, which is representative of the user interfaces of autonomous flight control programs discussed with respect to the preceding Figures, such as process 1100. When executed by processing system, the software directs the processing system to operate as described herein for at least the various processes, operational scenarios, and sequences discussed in the foregoing implementations.

Exemplary processing system may comprise a microprocessor and other circuitry that retrieves and executes software from storage. The processing system may be implemented within a single processing device but may also be distributed across multiple processing devices or sub-systems that cooperate in executing program instructions. Examples of processing systems include general purpose central processing units, graphical processing units, application specific processors, and logic devices, as well as any other type of processing device, combinations, or variations thereof.

An exemplary storage system may comprise any computer readable storage media readable by a processing system and capable of storing software. The storage system may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

The software may be implemented in program instructions and among other functions may, when executed by a processing system, direct the processing system to operate as described with respect to the various operational scenarios, sequences, and processes illustrated herein. In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. The software may include additional processes, programs, or components, such as operating system software, virtualization software, or other application software. The software may also comprise firmware or some other form of machine-readable processing instructions executable by a suitable processing system.

In general, the software may, when loaded into a processing system and executed, transform a suitable apparatus, system, or device overall from a general-purpose computing system into a special-purpose computing system as described herein. Encoding the software on a storage system may transform the physical structure of the storage system. The specific transformation of the physical structure may depend on various factors in different implementations of this description. Examples of such factors may include, but are not limited to, the technology used to implement the storage media of the storage system and whether the computer-storage media are characterized as primary or secondary storage, as well as other factors.

For example, if the computer readable storage media are implemented as semiconductor-based memory, the software may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

It may be further appreciated that the unmanned aerial vehicles, remote-control devices, or other devices in which aspects of the present invention may be embodied, may include a communication interface system. The communication interface system may include communication connections and devices that allow for communication with other computing systems and devices (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between such systems and devices may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

The unmanned aerial vehicles, remote-control devices, or other devices in which aspects of the present technology may be embodied, may include a user interface system. A user interface system may any one or more of a joystick, a keyboard, a mouse, a voice input device, a touch input device for receiving a touch gesture from a user, a motion input device for detecting non-touch gestures and other motions by a user, and other comparable input devices and associated processing elements capable of receiving user input from a user (e.g., joystick toggles). Output devices such as a display, speakers, haptic devices, and other types of output devices may also be included in the user interface system. In some cases, the input and output devices may be combined in a single device, such as a display capable of displaying images and receiving touch gestures. The aforementioned user input and output devices are well known in the art and need not be discussed at length here. The user interface system may also include associated user interface software executable by a suitable processing system in support of the various user input and output devices discussed above. Separately or in conjunction with each other and other hardware and software elements, the user interface software and user interface devices may support a graphical user interface, a natural user interface, or any other type of user interface.

It may be further appreciated that aspects of the present technology describe various operating scenarios for drone operation along a computed spline flight path or along a programmed flight path obtained from a continuous keyframe recording or other source. As the drone's autopilot issues modified joystick commands to the electromechanical subsystem based on the flight path and other external operational factors, the drone pilot may issue operational commands via the joystick on the remote-control device. The autopilot receives the joystick data and incorporates the data into the ostensible joystick commands issued to the UAV microprocessor. The autopilot retains control over the operation of the drone along the flight path, and the capability to incorporate joystick data into the operation of the drone effects an operational envelope along the flight path which allows the drone pilot to control one or more particular aspects of the flight to achieve optimal drone operation.

Unless the context clearly requires otherwise, throughout the description and the claims, the words "comprise," "comprising," "such as," and "the like" are to be construed in an inclusive sense, as opposed to an exclusive or exhaustive sense, that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having operations, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. An unmanned aerial vehicle comprising:
a flight control subsystem; and
an electromechanical subsystem coupled with the flight control subsystem and configured to fly the unmanned aerial vehicle as directed by the flight control subsystem;
wherein the flight control subsystem is configured to:
record keyframes during one or more flights of the unmanned aerial vehicle;
compute a spline based on at least one or more of the keyframes;
save the computed spline for playback when flying the unmanned aerial vehicle;
during a subsequent flight of the unmanned aerial vehicle:
direct the electromechanical subsystem to fly the unmanned aerial vehicle based on the computed spline;
receive user input from a remote control comprising a modification to the computed spline, wherein the user input comprises joystick data;
modify the computed spline based at least on the joystick data resulting in a modified version of the computed spline, wherein to modify the computed spline, the flight control system is configured to apply a dampening function to the joystick data resulting in an attenuation of the joystick data; and
save the modified version of the computed spline for later playback.

2. The unmanned aerial vehicle of claim 1, wherein the flight control subsystem is configured to cause the unmanned aerial vehicle to compute a return to the computed spline when the user input ceases, wherein the return is dampened according to the dampening function.

3. The unmanned aerial vehicle of claim 1, wherein the attenuation of the joystick data causes an attenuation of a dynamic response of the unmanned aerial vehicle.

4. The unmanned aerial vehicle of claim 1 wherein the user input comprises one or more of changes to one or more components of the computed spline, wherein the one or more components of the computed spline include one or more of position, direction, speed, and orientation of the unmanned aerial vehicle along the computed spline.

5. The unmanned aerial vehicle of claim 4 wherein the one or more components of the computed spline further include one or more of a camera focal length and a camera orientation with respect to the unmanned aerial vehicle.

6. The unmanned aerial vehicle of claim 4 wherein the user input comprises one or more of snapping the unmanned aerial vehicle directly to a new position on the computed spline out-of-turn with respect to a next position on the computed spline.

7. The unmanned aerial vehicle of claim 4 wherein the user input comprises reversing direction along the computed spline relative to present direction along the computed spline.

8. The unmanned aerial vehicle of claim 4 wherein the user input comprises hovering at a point on the computed spline.

9. The unmanned aerial vehicle of claim 4 wherein the flight control system is further configured to upload the modified version of the computed spline to a remote storage location.

10. The unmanned aerial vehicle of claim 4 wherein the one or more subsequent flights include a flight departing from, and arriving at, a dock.

11. A computing apparatus comprising:
one or more non-transitory computer-readable storage media; and
program instructions stored on the one or more non-transitory computer-readable storage media that, when executed by one or more processors, direct a flight control subsystem of an unmanned aerial vehicle to at least:
record keyframes during one or more flights of the unmanned aerial vehicle;
compute a spline based on at least one or more of the keyframes; and
save the computed spline for playback when flying the unmanned aerial vehicle;
during a subsequent flight of the unmanned aerial vehicle:
direct the electromechanical subsystem to fly the unmanned aerial vehicle based on the computed spline;
receive user input from a remote control comprising a modification to the computed spline, wherein the user input comprises joystick data;
modify the computed spline based at least on the joystick data resulting in a modified version of the computed spline, wherein to modify the computed spline, the program instructions direct the flight control subsystem to apply a dampening function to the joystick data resulting in an attenuation of the joystick data; and
save the modified version of the computed spline for later playback.

12. The computing apparatus of claim 11 wherein the flight control system causes the unmanned aerial vehicle to compute a return to the computed spline when the user input ceases, wherein the return is dampened according to the dampening function.

13. The computing apparatus of claim 11 wherein the attenuation of the joystick data causes an attenuation of a dynamic response of the unmanned aerial vehicle.

14. The computing apparatus of claim 11 wherein the user input comprises one or more of changes to one or more components of the computed spline, wherein the one or more components of the computed spline include one or more of position, direction, speed, and orientation of the unmanned aerial vehicle along the computed spline.

15. The computing apparatus of claim 14 wherein the one or more components of the computed spline further include one or more of a camera focal length and a camera orientation with respect to the unmanned aerial vehicle.

16. The computing apparatus of claim 14 wherein the user input comprises one or more of snapping the unmanned aerial vehicle directly to a new position on the computed spline out-of-turn with respect to a next position on the computed spline.

17. The computing apparatus of claim 14 wherein the user input comprises reversing direction along the computed spline relative to present direction along the computed spline.

18. The computing apparatus of claim 14 wherein the user input comprises hovering at a point on the computed spline.

19. The computing apparatus of claim 14 wherein the flight control system is further configured to upload the modified version of the computed spline to a remote storage location.

20. A method of operating an unmanned aerial vehicle, the method comprising:
in a flight control subsystem of the unmanned aerial vehicle:
recording keyframes during one or more flights of the unmanned aerial vehicle;
computing a spline based on at least one or more of the keyframes; and
saving the computed spline for playback when flying the unmanned aerial vehicle;
during a subsequent flight of the unmanned aerial vehicle:
directing the electromechanical subsystem to fly the unmanned aerial vehicle based on the computed spline;
receiving user input from a remote control comprising a modification to the computed spline, wherein the user input comprises joystick data;
modifying the computed spline based at least on the joystick data resulting in a modified version of the computed spline, wherein modifying the computed spline comprises applying a dampening function to the joystick data resulting in an attenuation of the joystick data; and
saving the modified version of the computed spline for later playback.

21. An unmanned aerial vehicle comprising:
a flight control subsystem; and
an electromechanical subsystem coupled with the flight control subsystem and configured to fly the unmanned aerial vehicle as directed by the flight control subsystem;
wherein the flight control subsystem is configured to:
compute a spline along which to fly the unmanned aerial vehicle;
receive input from a control device remote from the unmanned aerial vehicle while flying the unmanned aerial vehicle along the computed spline, wherein the input comprises joystick data;
compute a modification to the computed spline based at least on the joystick data and one or more governing factors associated with modifications to the computed spline, wherein a governing factor of the one or more governing factors comprises a dampening function applied to the joystick data resulting in an attenuation of the joystick data; and
direct the electromechanical subsystem to fly the drone based on at least the modification to the computed spline.

22. The unmanned aerial vehicle of claim 21 wherein, when the joystick data indicate a departure from the computed spline, the modification comprises a path departing from the computed spline.

23. The unmanned aerial vehicle of claim 22 wherein, when the joystick data indicate a return to the computed spline, the modification to the computed spline comprises a path returning to the computed spline.

24. The unmanned aerial vehicle of claim 21 wherein the attenuation of the joystick data causes an attenuation of a dynamic response of the unmanned aerial vehicle.

25. The unmanned aerial vehicle of claim 24 wherein the dampening function prevents the modifications to the computed spline from exceeding a flight envelope around the computed spline.

26. The unmanned aerial vehicle of claim 21 wherein the one or more governing factors comprise an object avoidance function applied to the joystick data.

27. The unmanned aerial vehicle of claim 21 wherein the flight control subsystem comprises an autopilot system, and wherein, to compute the modification to the computed spline, the autopilot system is configured to compute modified joystick data based on the joystick data and the one or more governing factors.

28. The unmanned aerial vehicle of claim 27 wherein the flight control subsystem further comprises a flight controller coupled with the autopilot system, and wherein, to direct the electromechanical subsystem to fly the drone based at least on the modification to the computed spline, the flight controller is configured to direct the electromechanical subsystem based at least on the modified joystick data computed by the autopilot system.

29. The unmanned aerial vehicle of claim 21 wherein the computed spline comprises a set of points along a path and flight parameters at each point of the set of points, wherein the modification to the computed spline comprises a new set of points offset from the path and new flight parameters at each point of the new set of points.

30. The unmanned aerial vehicle of claim 29 wherein the flight parameters comprise a position and orientation of the unmanned aerial vehicle, and wherein the new flight parameters comprise one or more of a new position and a new orientation of the unmanned aerial vehicle.

* * * * *